(12) United States Patent
Yanagisawa et al.

(10) Patent No.: US 8,396,357 B2
(45) Date of Patent: Mar. 12, 2013

(54) OPTICAL UNIT WITH SHAKE CORRECTION FUNCTION, OPTICAL APPARATUS, AND METHOD OF MANUFACTURING OPTICAL UNIT WITH SHAKE CORRECTION FUNCTION

(75) Inventors: Katsushige Yanagisawa, Nagano (JP); Hisahiro Ishihara, Nagano (JP); Shinji Minamisawa, Nagano (JP); Yuichi Takei, Nagano (JP); Tadashi Takeda, Nagano (JP); Toshiyuki Karasawa, Nagano (JP); Akihiro Nagata, Nagano (JP); Kiyoshi Miyazaki, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 13/124,351

(22) PCT Filed: Oct. 2, 2009

(86) PCT No.: PCT/JP2009/005125
§ 371 (c)(1),
(2), (4) Date: Jul. 12, 2011

(87) PCT Pub. No.: WO2010/044212
PCT Pub. Date: Apr. 22, 2010

(65) Prior Publication Data
US 2011/0262121 A1    Oct. 27, 2011

(30) Foreign Application Priority Data
Oct. 14, 2008    (JP) .................................. 2008-265677

(51) Int. Cl.
*G03B 17/00*    (2006.01)
*H04N 5/228*    (2006.01)

(52) U.S. Cl. ........................................ 396/55; 348/208.7
(58) Field of Classification Search .................... 396/55; 348/208.7; 359/554
See application file for complete search history.

(56) References Cited

U.S. PATENT DOCUMENTS
7,725,014 B2 * 5/2010 Lam et al. ........................ 396/55
(Continued)

FOREIGN PATENT DOCUMENTS
JP    2000-330155    11/2000
(Continued)

OTHER PUBLICATIONS

International Search Report for International Application No. PCT/JP2009/005125 with English translation mailed Dec. 22, 2009.

*Primary Examiner* — Clayton E Laballe
*Assistant Examiner* — Noam Reisner
(74) *Attorney, Agent, or Firm* — Cantor Colburn LLP

(57) ABSTRACT

An optical unit with shake correcting function may include a movable module on which an optical element is mounted, a fixed body which supports the movable module, a shake detection sensor which detects a shake of the movable module, a shake correction magnetic drive mechanism which swings the movable module on the fixed body on a basis of a detection result of the shake detection sensor to correct the shake of the movable module, and a spring member which is connected with the fixed body and the movable module. A stopper mechanism may be structured between the movable module and the fixed body, and the stopper mechanism may moving ranges of the movable module due to the shake.

31 Claims, 19 Drawing Sheets

U.S. PATENT DOCUMENTS

| | | | |
|---|---|---|---|
| 2008/0192124 A1* | 8/2008 | Nagasaki | 348/208.11 |
| 2009/0052037 A1* | 2/2009 | Wernersson | 359/554 |

FOREIGN PATENT DOCUMENTS

| | | |
|---|---|---|
| JP | 2006-154345 | 6/2006 |
| JP | 2006-295553 | 10/2006 |
| JP | 2006-343460 | 12/2006 |
| JP | 2007-41419 | 2/2007 |
| JP | 2007-129295 | 5/2007 |
| JP | 2008-185677 | 8/2008 |

* cited by examiner

OPTICAL UNIT WITH SHAKE CORRECTION FUNCTION, OPTICAL APPARATUS, AND METHOD OF MANUFACTURING OPTICAL UNIT WITH SHAKE CORRECTION FUNCTION

CROSS REFERENCE TO RELATED APPLICATIONS

This is a U.S. national stage of international application No. PCT/JP2009/005125, filed on Oct. 2, 2009. Priority under 35 U.S.C. §119(a) and ±U.S.C. §365(b) is claimed from Japanese Application No. 2008-265677, filed Oct. 14, 2008 the disclosure of which is also incorporated herein by reference.

TECHNICAL FIELD

The present invention relates to an optical unit with shake correcting function in which a module having a lens is swung to correct a shake such as a shake of hand, an optical device on which the optical unit with shake correcting function is mounted, and a manufacturing method for the optical unit with shake correcting function.

BACKGROUND

In an optical device such as a photographic optical device which is mounted on a cell phone or a digital camera, a laser beam pointer, and a portable projection display device or a projection display device for a car, when a shake or external vibration is transmitted, a shake is easily occurred in its optical axis.

In order to prevent this problem, in a photographic optical unit which is used, for example, in a portable photographic optical device, a technique has been proposed that a movable module on which a lens is mounted is supported by a fixed body through an elastic material, an actuator is structured on each of side faces of the movable module, and the movable module is swung around an X-axis and a Y-axis perpendicular to an optical axis direction (Z-axis direction) of the actuator on the basis of a detection result of a shake detection sensor that is mounted on the movable module to correct the shake (see Patent Literature 1).

PATENT LITERATURE

[PTL 1] FIG. 12 in Japanese Patent Laid-Open No. 2007-129295

However, in Patent Literature 1, although the movable module is capable of displacing in all directions, impact resistance is not taken into consideration. Therefore, when an impact is applied from the outside to a device on which a photographic optical unit is mounted to displace the movable module, a portion between the movable module and the fixed body or the movable module may be damaged. Therefore, the optical unit described in Patent Literature 1 has a low impact resistance.

In view of the problem described above, at least an embodiment of the present invention provides an optical unit with shake correcting function which is capable of improving impact resistance, to provide an optical device on which the optical unit with shake correcting function is mounted, and to provide a manufacturing method for the optical unit with shake correcting function.

SUMMARY

In order to solve the problem, at least an embodiment of the present invention provides an optical unit with shake correcting function including a movable module on which an optical element is mounted, a fixed body which supports the movable module, a shake detection sensor which detects a shake of the movable module, a shake correction magnetic drive mechanism which swings the movable module on the fixed body on the basis of a detection result of the shake detection sensor to correct the shake of the movable module, and a spring member which is connected with the fixed body and the movable module. When three directions perpendicular to each other in the fixed body are set to be an X-axis, a Y-axis and a Z-axis, and a direction along an optical axis is set to be the Z-axis, a stopper mechanism is structured between the movable module and the fixed body, and the stopper mechanism restricts moving ranges of the movable module in both directions in an X-axis direction, both directions in a Y-axis direction, both directions in a Z-axis direction, both directions around the X-axis, both directions around the Y-axis and both directions around the Z-axis.

In at least an embodiment of the present invention, even when the movable module is displaced due to an impact from the outside, the displacement is restricted by the stopper mechanism. Therefore, since the spring member and the movable module are not damaged, the impact resistance of the optical unit with shake correcting function is improved.

Another embodiment of the present invention provides an optical unit with shake correcting function including a movable module on which an optical element is mounted, a fixed body which supports the movable module, a shake detection sensor which detects a shake of the movable module, a shake correction magnetic drive mechanism which swings the movable module on the fixed body on the basis of a detection result of the shake detection sensor to correct the shake of the movable module, a spring member which is connected with the fixed body and the movable module, and a swing support point which is structured between the fixed body and the movable module. The spring member urges the movable module toward the swing support point and a portion of the fixed body which structures the swing support point is provided with a spring part that enables the swing support point to displace in an optical axis direction.

In at least an embodiment of the present invention, the swing support point is structured on the rear side of the movable module. Therefore, even when an impact is applied from the outside in a direction so that the movable module is pressed against the fixed body, since the fixed body is formed with the spring part that enables the swing support point to displace in the optical axis direction, the spring part is resiliently bent before the impact concentrated on the swing support point reaches to a magnitude that the swing support point is damaged and thus the impact is supported by another portion which is different from the swing support point of the movable module. Therefore, the swing support point is not damaged because the impact concentrated on the swing support point does not become larger than a restoring force of the spring which is generated by resiliently bending of the spring part. Accordingly, the impact resistance of the optical unit with shake correcting function is improved. In addition, a deflection amount of the spring part is set in a range that does not exceed the stress limit of the spring part and thus the spring part is not deformed plastically by the impact. Therefore, in a state that an impact is not applied, the spring part is returned to its original shape and the spring part can also stand against repeated impacts.

In at least an embodiment of the present invention, it is preferable that the spring part is a flat spring part which is structured so that the fixed body is worked. According to this structure, even when a separate member is not used, the impact resistance of the optical unit with shake correcting function is improved.

In at least an embodiment of the present invention, it is preferable that, in the fixed body, a rear side of the swing support point and a portion where the flat spring part is formed is dented to a front side. According to this structure, even when the swing support point is displaced to the rear side, the flat spring part is not protruded to the rear side in the fixed body.

Also in this structure in at least an embodiment of the present invention, when three directions perpendicular to each other in the fixed body are set to be an X-axis, a Y-axis and a Z-axis, and a direction along an optical axis is set to be the Z-axis, it is preferable that a stopper mechanism is structured between the movable module and the fixed body so that the stopper mechanism restricts moving ranges of the movable module in both directions in an X-axis direction, both directions in a Y-axis direction, both directions in a Z-axis direction, both directions around the X-axis, both directions around the Y-axis and both directions around the Z-axis. According to this structure, even when the movable module is displaced due to an impact from the outside, the displacement is restricted by the stopper mechanism. Therefore, since the spring member and the movable module are not damaged, the impact resistance of the optical unit with shake correcting function is improved.

In at least an embodiment of the present invention, it may be structured that the swing support point part is a pivot part which is provided with a support protruded part, which is protruded in the Z-axis direction from one of the fixed body and the movable module, and a supporting recessed part which is formed on the other of the fixed body and the movable module and into which the support protruded part is fitted and, in the stopper mechanism, the moving range of the movable module in the both directions in the X-axis direction and the moving range of the both directions in the Y-axis direction are restricted between an outer peripheral side face of the support protruded part and an inner peripheral side face of the supporting recessed part.

In at least an embodiment of the present invention, it is preferable that the movable module is provided with a protruded part which is protruded in a direction intersecting the Z-axis direction and, in the stopper mechanism, at least one of the moving ranges of the movable module in the both directions in the X-axis direction, the both directions in the Y-axis direction, the both directions in the Z-axis direction, the both directions around the X-axis, the both directions around the Y-axis and the both directions around the Z-axis is restricted.

In this case, it is preferable that a shape of the movable module when viewed in the Z-axis direction is rectangular and, in the stopper mechanism, at least one of the moving ranges of the movable module in the both directions around the X-axis, the both directions around the Y-axis and the both directions around the Z-axis is restricted between the protruded part and the fixed body at a corner portion when the movable module is viewed in the Z-axis direction. When the movable module is displaced around the X-axis, around the Y-axis and around the Z-axis, the movements are the maximum at a corner portion. Therefore, since a large error in the dimension of the gap space between the protruded part and the fixed body is permitted at the corner portion, assembling is easy and the moving range can be set accurately.

In at least an embodiment of the present invention, it is preferable that, in the stopper mechanism, the moving range of the movable module in the both directions in the Z-axis direction is restricted between the protruded part and the fixed body on a swing center line of the movable module when viewed in the Z-axis direction. Even when the movable module is swung, displacement in the Z-axis direction is small at a position superposing on the swing center axial line in the Z-axis direction. Therefore, when displacement in the Z-axis direction is restricted at the position, the moving range in the Z-axis direction of the movable module can be restricted accurately.

In at least an embodiment of the present invention, it is preferable that, in the stopper mechanism, the moving ranges of the movable module in the both directions in the X-axis direction and the both directions in the Y-axis direction are restricted between the protruded part and the fixed body.

In at least an embodiment of the present invention, it is preferable that the protruded part is disposed in the Z-axis direction between a position in the Z-axis direction of a magnet and a coil which structure the shake correction magnetic drive mechanism and a position in the Z-axis direction of the swing support point. A portion at the position is a free space and thus, even when the size of the optical unit with shake correcting function is reduced, the protruded part and the stopper mechanism utilizing the protruded part are structured.

In at least an embodiment of the present invention, it is preferable that, in the stopper mechanism, a portion of at least one of the movable module and the fixed body which restricts the moving range in one of the both directions in the Z-axis direction is formed in a circular arc face with a swing center of the movable module as a center. According to this structure, even when the movable module is inclined, the moving range in the Z-axis direction of the movable module is restricted accurately.

In at least an embodiment of the present invention, it may be structured that, in the stopper mechanism, the moving range to a front side in the Z-axis direction of the movable module is restricted between a front end part of the movable module and a front end part of the fixed body, and at least one of the front end part of the movable module and the front end part of the fixed body is formed in the circular arc face with the swing center of the movable module as the center.

In at least an embodiment of the present invention, it may be structured that, in the stopper mechanism, at least one of the moving ranges of the movable module in the both directions in the X-axis direction, the both directions in the Y-axis direction, the both directions around the X-axis, and the both directions around the Y-axis is restricted between a protruded part which is disposed on an inner side of an air-core coil and a magnet that are used in the shake correction magnetic drive mechanism. According to this structure, the moving ranges of the movable module in the both directions in the X-axis direction, the both directions in the Y-axis direction, the both directions around the X-axis, the both directions around the Y-axis and the like are surely restricted.

In at least an embodiment of the present invention, it is preferable that at least one of portions structuring the stopper mechanism in the movable module and the fixed body is formed of resin or rubber. According to this structure, vibration is hard to propagate to the surroundings when the stopper mechanism is operated.

Further, it may be structured that at least one of portions structuring the stopper mechanism in the movable module and the fixed body is formed of impact absorption material which is stuck on the movable module or the fixed body. Also in this structure, vibration is hard to propagate to the surroundings when the stopper mechanism is operated.

In at least an embodiment of the present invention, it is preferable that the shake detection sensor is mounted on the movable module.

In at least an embodiment of the present invention, it may be structured that the optical element is a lens, the movable module is mounted with an imaging element on a rear side with respect to the lens, and the shake detection sensor detect a shake at a time of photographing.

In an optical device which is provided with the optical unit with shake correcting function to which at least an embodiment of the present invention is applied, it is preferable that the optical unit with shake correcting function is mounted on an optical device main body through impact absorption material.

In accordance with at least an embodiment of the present invention, in a manufacturing method for an optical unit with shake correcting function which is provided with a movable module on which an optical element is mounted, a fixed body which supports the movable module, a shake detection sensor which detects a shake of the movable module, a shake correction magnetic drive mechanism which swings the movable module on the fixed body on the basis of a detection result of the shake detection sensor to correct the shake of the movable module, and a spring member which is connected with the fixed body and the movable module, the following manufacturing methods are adopted.

First, after the movable module is disposed so as to be separated from the fixed body through a predetermined gap space, the spring member is attached to the fixed body and the movable module.

Further, it may be manufactured that, after the movable module and the spring member are connected with each other, the movable module is disposed so as to be separated from the fixed body through a predetermined gap space and then, the fixed body and the spring member are connected with each other.

Further, it may be manufactured that, after the fixed body and the spring member are connected with each other, the movable module is disposed so as to be separated from the fixed body through a predetermined gap space and then, the movable module and the spring member are connected with each other.

A predetermined gap space is secured between the movable module and the fixed body in all cases that the methods described above are adopted.

In the optical unit with shake correcting function to which at least an embodiment of the present invention is applied, when a stopper mechanism is structured which restricts moving ranges of the movable module in both directions in an X-axis direction, both directions in a Y-axis direction, both directions in a Z-axis direction, both directions around the X-axis, both directions around the Y-axis and both directions around the Z-axis, even when the movable module is displaced due to impact from the outside, the displacement is restricted by the stopper mechanism. Therefore, since the spring member and the movable module are not damaged, the impact resistance of the optical unit with shake correcting function is improved.

In the optical unit with shake correcting function to which at least an embodiment of the present invention is applied, when an impact is applied from the outside in a direction so that the movable module is pressed against the fixed body, since the fixed body is formed with a spring part that enables the swing support point to displace in the optical axis direction, the spring part is resiliently bent before the impact concentrated on the swing support point reaches to a magnitude that the swing support point is damaged and thus the impact is supported by another portion which is different from the swing support point of the movable module. Therefore, the impact concentrated on the swing support point does not become larger than a restoring force of the spring which is generated by resiliently bending of the spring part and thus the swing support point is not damaged. Accordingly, the impact resistance of the optical unit with shake correcting function is improved. Further, a deflection amount of the spring part is set in a range that does not exceed the stress limit of the spring part and thus the spring part is not plastically deformed by the impact. Therefore, when an impact is not applied, the spring part is returned to its original shape and the spring part can also stand against repeated impacts.

In the manufacturing method for the optical unit with shake correcting function to which at least an embodiment of the present invention is applied, after the movable module is disposed so as to be separated from the fixed body through a predetermined gap space, the spring member is attached to the fixed body and the movable module. Alternatively, after the movable module and the spring member are connected with each other, the movable module is disposed so as to be separated from the fixed body through a predetermined gap space and then, the fixed body and the spring member are connected with each other. Alternatively, after the fixed body and the spring member are connected with each other, the movable module is disposed so as to be separated from the fixed body through a predetermined gap space and then, the movable module and the spring member are connected with each other. Therefore, since a predetermined gap space is secured between the movable module and the fixed body, even when an impact is applied to the movable module, an excessive shake is not occurred in the movable module and the movable module is not rapidly collided with the fixed body. Accordingly, the impact resistance of the optical unit with shake correcting function is improved.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

An embodiment of the present invention will be described below with reference to the accompanying drawings. In the following description, three directions perpendicular to each other in a fixed body are set to be an X-axis, a Y-axis and a Z-axis, and the direction along an optical axis "L" (lens optical axis) is set to be the Z-axis. Therefore, in the following description, swing around the X-axis corresponds to a so-called pitching (vertical swing), swing around the Y-axis corresponds to a so-called yawing (lateral swing) and swing around the Z-axis corresponds to a so-called rolling. Further, in the following description, "object to be photographed side" is described as a "front side" or an "upper side" and an "opposite side to the object to be photographed side" is described as a "rear side" or a "lower side".

(Entire Structure of Optical Unit with Shake Correcting Function)

Figure 1A:
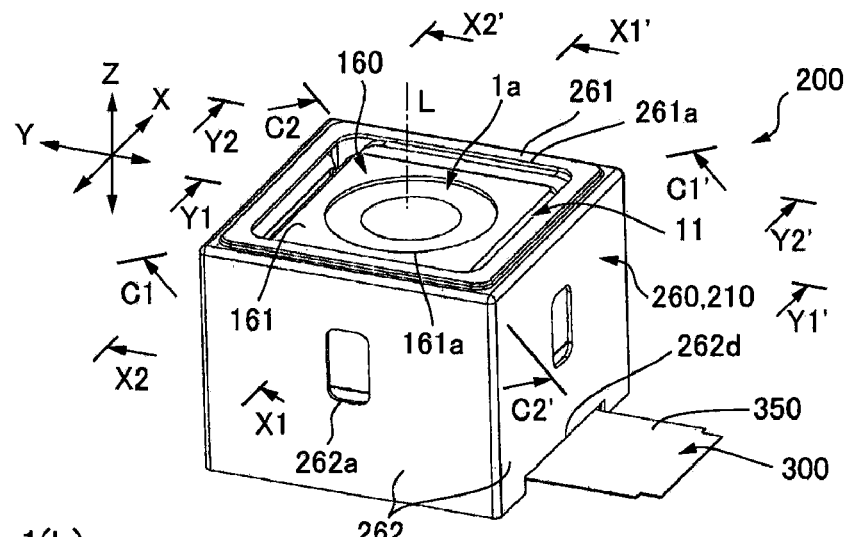
FIGS. 1(a), 1(b) and 1(c) are explanatory views showing an entire optical unit with shake correcting function in accordance with at least an embodiment of the present invention.
Figure 1B:
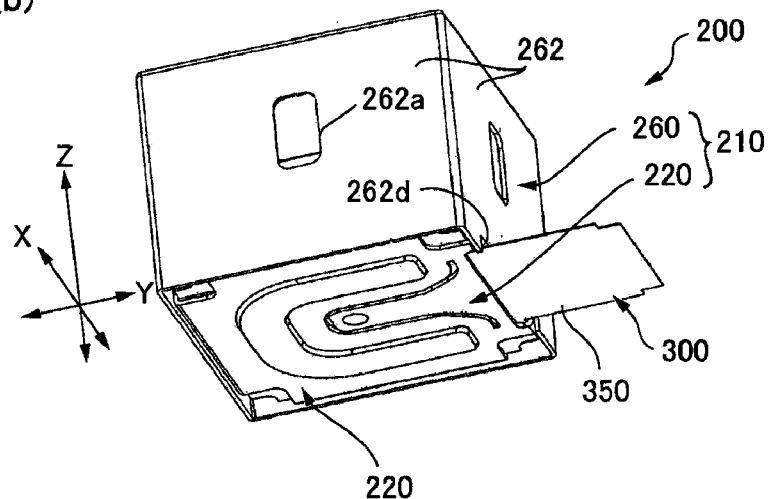
Figure 1C:
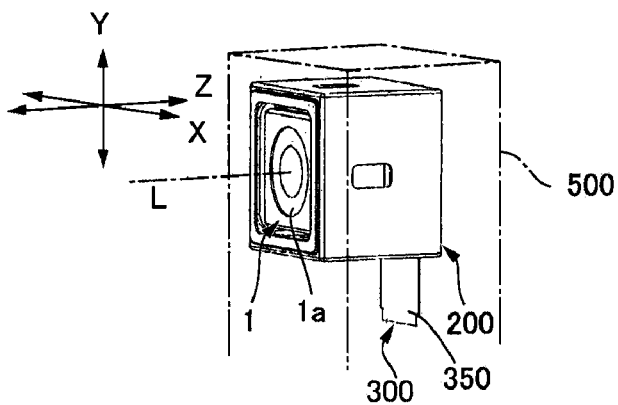

FIGS. 1(a), 1(b) and 1(c) are explanatory views showing an entire optical unit with shake correcting function to which at least an embodiment of the present invention is applied. FIG. 1(a) is a perspective view showing an optical unit with shake correcting function to which at least an embodiment of the present invention is applied and which is viewed from an object to be photographed side (front side), FIG. 1(b) is a perspective view showing the optical unit viewed from the rear side which is an opposite side to the object to be photographed side, and FIG. 1(c) is an explanatory view showing a state where the optical unit with shake correcting function is mounted on an optical device such as a cell phone.

An optical unit 200 with shake correcting function (for example, optical unit with shake-by-hand correcting function) shown in FIGS. 1(a) and 1(b) is a thin type camera which is used in a cell phone with a camera. The optical unit 200 is provided with a substantially rectangular prism shape as a whole. In this embodiment, the optical unit 200 with shake correcting function includes a base 220 in a roughly rectangular plate shape and a box-shaped fixed cover 260 which is covered on an upper side of the base 220. The base 220 and the fixed cover 260 are fixed to each other to structure a part of the fixed body 210. The fixed body 210 may be fixed with an attached module which includes a shutter mechanism, a filter drive mechanism by which various filters are switched to a position on an optical axis or to a position retracted from the optical axis, and a diaphragm mechanism in a front side end part of the fixed cover 260 (object side end part).

The fixed cover 260 is formed in a rectangular shape when viewed in a direction of the optical axis "L" (direction of Z-axis) and the fixed cover 260 is provided with a rectangular top plate part 261 on its front side. The top plate part 261 is formed with a rectangular opening part 261a and four side plate parts 262 are extended from an outer peripheral edge of the top plate part 261 toward the rear side. Rear end edges of two side plate parts 262 located in the Y-axis direction are formed with a cut-out part 262d and a lead-out part 350 of a flexible circuit board 300 is drawn in the Y-axis direction from one of two side plate parts 262 located in the Y-axis direction through the cut-out part 262d.

An inside of the fixed cover 260 is disposed with a movable module 1 which accommodates a focus mechanism for a lens (optical element) and, as described below, a shake correction mechanism which swings the movable module 1 to perform hand shake correction is structured in the inside of the fixed cover 260. The movable module 1 includes a lens drive module 1a accommodating the focus mechanism for a lens in its inside and the lens drive module 1a is held in the inside of a rectangular tube-shaped module cover 160.

The lead-out part 350 of the flexible circuit board 300 is fixed to the side plate part 262 with an adhesive or the like. In this embodiment, the movable module 1 and the shake correction mechanism described below are electrically connected with the outside through the flexible circuit board 300.

For example, an end part of the lead-out part 350 of the flexible circuit board 300 is connected with a connector (not shown) which is disposed on an outer side.

(Structure of Lens Drive Module)

Figures 2A, 2B:
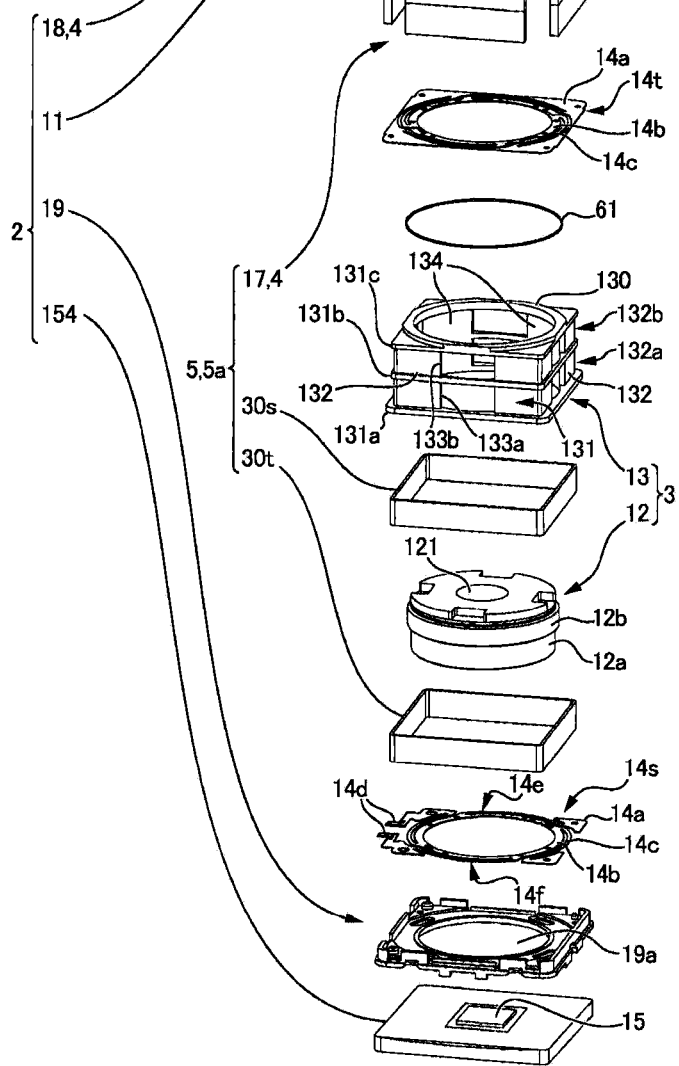
FIGS. 2(a) and 2(b) are explanatory views showing a lens drive module which is structured within a movable module of an optical unit with shake correcting function in accordance with at least an embodiment of the present invention.
Figure 3:
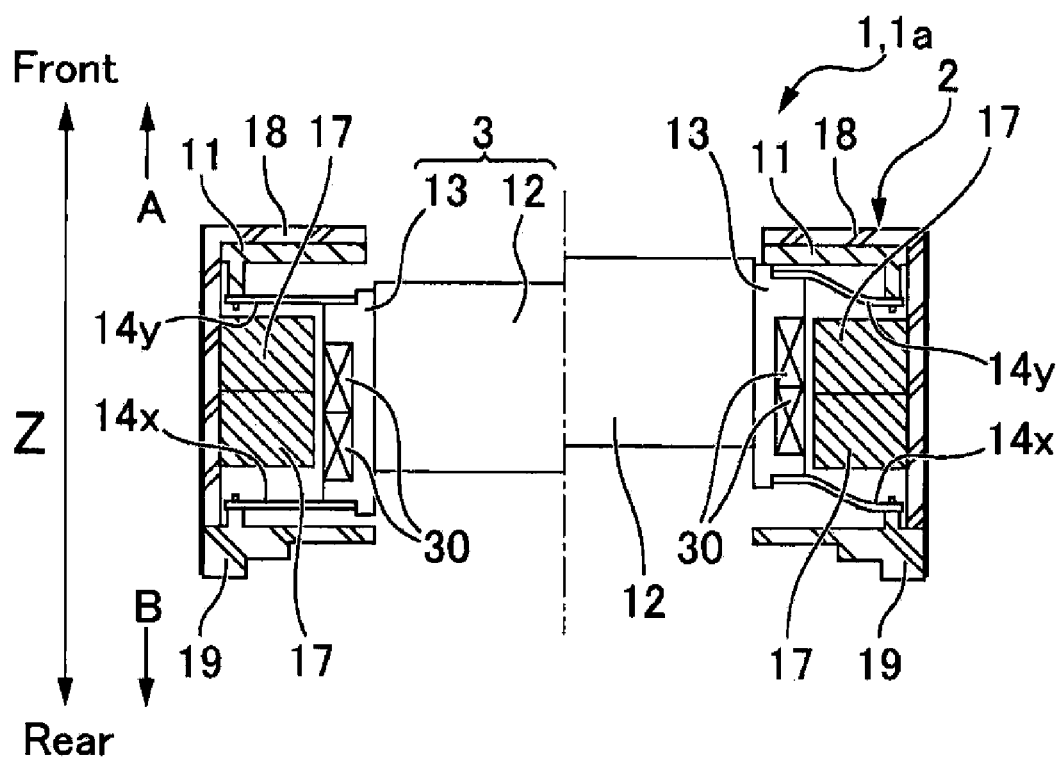
FIG. 3 is an explanatory view schematically showing an operation of the lens drive module shown in FIGS. 2(a) and 2(b).

FIGS. 2(*a*) and 2(*b*) are explanatory views showing the lens drive module 1*a* which is structured in the movable module 1 of the optical unit 200 with shake correcting function to which at least an embodiment of the present invention is applied. FIG. 2(*a*) is an outward appearance view showing the lens drive module 1*a* which is viewed from obliquely above and FIG. 2(*b*) is its exploded perspective view. FIG. 3 is an explanatory view schematically showing an operation of the lens drive module 1*a* shown in FIGS. 2(*a*) and 2(*b*). The left half portion in FIG. 3 shows a state where the movable body 3 is located at an infinity position (normal photographing position) and the right half portion in FIG. 3 shows a state where the movable body 3 is located at a macro-position (close-up photographing position).

In FIGS. 2(*a*) and 2(*b*) and FIG. 3, the lens drive module 1*a* moves a lens (optical element) along the direction of the optical axis "L" in both of an "A"-direction (front side) toward an object to be photographed side (object side) and a "B"-direction (rear side) toward an opposite side to the object to be photographed side (imaging element side/image side). The lens drive module 1*a* is formed in a substantially rectangular prism shape. The lens drive module 1*a* generally includes the movable body 3, which holds three lenses 121 (optical element) and a fixed diaphragm in its inside, a lens drive mechanism 5 for moving the movable body 3 along the direction of the optical axis "L", and a support body 2 on which the lens drive mechanism 5, the movable body 3 and the like are mounted. The movable body 3 includes a lens holder 12 in a cylindrical shape which holds the lenses 121 and the fixed diaphragm and a lens drive coil holder 13 which holds lens drive coils 30*s* and 30*t* described below on its outer peripheral side face.

The support body 2 includes an imaging element holder 19 in a rectangular plate shape which holds an imaging element 15 in a positioned state on an opposite side to the object to be photographed side, a box-shaped case 18 which is disposed on the object to be photographed side as a cover to the imaging element holder 19, and a spacer 11 in a rectangular plate shape which is disposed in the inside of the case 18. Centers of the case 18 and the spacer 11 are respectively formed with circular incident windows 110 and 18*a* for introducing a light from the object to be photographed into the lenses 121. Further, a center of the imaging element holder 19 is formed with an opening 19*a* for introducing the incident light into the imaging element 15.

In the lens drive module 1*a*, the support body 2 includes a circuit board 154 on which the imaging element 15 is mounted and the circuit board 154 is fixed to the under face of the imaging element holder 19. The circuit board 154 is a double-side circuit board and the flexible circuit board 300 shown in FIGS. 1(*a*), 1(*b*) and 1(*c*) is connected with the under face of the circuit board 154.

In this embodiment, the case 18 is made of a ferromagnetic plate such as a steel plate and the case 18 also functions as a yoke. Therefore, the case 18 structures an interlinkage magnetic field generating body 4 together with lens drive magnets 17 described below for generating interlinkage magnetic field in lens drive coils 30*s* and 30*t* which are held by a lens drive coil holder 13. The interlinkage magnetic field generating body 4 structures the lens drive mechanism 5 together with the lens drive coils 30*s* and 30*t* which are wound around the outer peripheral face of the lens drive coil holder 13.

The support body 2 and the movable body 3 are connected with each other through metal spring members 14*s* and 14*t*. Basic structures of the spring members 14*s* and 14*t* are similar to each other. Each of the spring members 14*s* and 14*t* is provided with an outer peripheral side connecting part 14*a* which is held by the support body 2, a ring-shaped inner peripheral side connecting part 14*b* which is held by the movable body 3, and an arm-shaped flat spring part 14*c* which connects the outer peripheral side connecting part 14*a* with the inner peripheral side connecting part 14*b*. The outer peripheral side connecting part 14*a* of the spring member 14*s* on the imaging element side is held by the imaging element holder 19 and its inner peripheral side connecting part 14*b* is connected with an imaging element side end face of the lens drive coil holder 13 of the movable body 3. The outer peripheral side connecting part 14*a* of the spring member 14*t* on the object to be photographed side is held by the spacer 11, and its inner peripheral side connecting part 14*b* is connected with an object to be photographed side end face of the lens drive coil holder 13 of the movable body 3. In this manner, the movable body 3 is movably supported along the direction of the optical axis "L" by the support body 2 through the spring members 14*s* and 14*t*. Each of the spring members 14*s* and 14*t* is made of nonmagnetic metal such as beryllium copper or nonmagnetic SUS steel material and is formed by means of that a thin plate having a predetermined thickness is performed by press working or etching processing with the use of photo lithography technique. The spring member 14*s* is divided into two spring pieces 14*e* and 14*f* and coil ends of the lens drive coils 30*s* and 30*t* are respectively connected with the spring pieces 14*e* and 14*f*. Further, the spring pieces 14*e* and 14*f* of the spring member 14*s* are respectively formed with terminals 14*d* and the spring member 14*s* (spring pieces 14*e* and 14*f*) also functions as a power supply member to the lens drive coils 30*s* and 30*t*.

In this embodiment, a ring-shaped magnetic piece 61 is held on the front side end face of the lens drive coil holder 13 and the magnetic piece 61 is located at a front side position with respect to the lens drive magnets 17. The magnetic piece 61 applies an urging force in the direction of the optical axis "L" to the movable body 3 by an attraction force generated between the lens drive magnets 17 and the magnetic piece 61. Therefore, the movable body 3 is prevented from being displaced by its own weight at no energization time and thus the movable body 3 is maintained in a desired posture and its impact resistance is improved. Further, since the magnetic piece 61 is disposed on the front side end face of the lens holder 12, at no energization time (home position), the lens holder 12 is placed in a stationary state on the rear side by means of that the magnetic piece 61 is attracted by the lens drive magnets 17.

In the lens drive module 1*a* in this embodiment, when viewed from the direction of the optical axis "L", the lens 121 is formed in a circular shape but the case 18 used for the support body 2 is formed in a rectangular box shape. Therefore, the case 18 is provided with a rectangular tube-shaped body part 18*c* and an upper plate part 18*g* having an incident window 18*a* on an upper face side of the rectangular tube-shaped body part 18*c*. In this embodiment, the rectangular tube-shaped body part 18*c* is formed in a square tube shape and provided with four side plate parts 18*b* at respective positions corresponding to sides of a quadrangle when viewed from the direction of the optical axis "L". Respective inner faces of four side plate parts 18*b* are fixed with the lens drive magnets 17 and each of the lens drive magnets 17 is formed of a rectangular flat plate-shaped permanent magnet. Each of four lens drive magnets 17 is magnetically divided into two pieces in the direction of the optical axis "L" and each of the pieces is magnetized so that its inner face and outer face are magnetized in different poles from each other. For example, in four lens drive magnets 17, an inner face of an upper half portion is magnetized in an "N"-pole and its outer face is magnetized in an "S"-pole, and an inner face of a lower half portion is magnetized in an "S"-pole and its outer face is magnetized in an "N"-pole. Therefore, in four lens drive magnets 17, arrangement of the magnetic poles of adjacent permanent magnets is the same as each other and thus interlinkage flux lines to the coils are generated efficiently.

The movable body 3 includes the lens holder 12 in a cylindrical shape, which holds the lenses 121 and the like, and the lens drive coil holder 13 in which the coil (lens drive coils 30s and 30t) are wound around its outer peripheral side face. A side wall portion of the movable body 3 is structured by the lens holder 12 and the lens drive coil holder 13. The lens holder 12 is structured so that its upper half portion is formed in a large diameter cylindrical part 12b having a larger diameter and its lower half portion is formed in a small diameter cylindrical part 12a having a smaller diameter than the large diameter cylindrical part 12b. The lens drive coil holder 13 is provided with a circular lens holder accommodating opening 130 for holding the lens holder 12 in its inside.

In this embodiment, an inner circumferential shape of the lens drive coil holder 13 is circular when viewed in the direction of the optical axis "L" but its outer peripheral side face 131 which defines the outer peripheral shape of the lens drive coil holder 13 is formed in a quadrangle and thus four faces 132 are provided at respective positions corresponding to four sides of the quadrangle. In the outer peripheral side face 131 of the lens drive coil holder 13, rib-shaped protruded parts 131a, 131b and 131c are formed at both end parts and a center position in the direction of the optical axis "L" over the entire periphery. A recessed part between the rib-shaped protruded part 131a which is formed at the imaging element side end part and the rib-shaped protruded part 131b formed at the center position is a first coil winding part 132a, and a recessed part between the rib-shaped protruded part 131c which is formed at the object side end part and the rib-shaped protruded part 131b formed at the center position is a second coil winding part 132b.

Each of four faces 132 of the lens drive coil holder 13 is formed with a rectangular through hole (through holes 133a and 133b) so that center portions of the first coil winding part 132a and the second coil winding part 132b are respectively removed so as to avoid the corner portion of the quadrangle. The through holes 133a and 133b are penetrated through the side wall of the lens drive coil holder 13 in an inside and outside direction. In this manner in this embodiment, hollow portions which are recessed toward inside are structured in the outer peripheral side face 131 of the movable body 3 by the through holes 133a and 133b of the lens drive coil holder 13. The through holes 133a and 133b are formed at center portions in the peripheral direction between adjacent corner portions in the outer peripheral side face 131 of the lens drive coil holder 13. Lengths of the through holes 133a and 133b in the peripheral direction are set to be about ⅓ of lengths of the respective faces 132 (side dimension of the quadrangle). Therefore, the corner portions of the lens drive coil holder 13 are formed with support pillar portions 134 having a larger wall thickness which are extended with a similar thickness toward the direction of the optical axis "L".

In the lens drive coil holder 13 which is structured as described above, the lens drive coil 30s is wound around the first coil winding part 132a and the lens drive coil 30t is wound around the second coil winding part 132b. In this embodiment, the first coil winding part 132a and the second coil winding part 132b are formed in a rectangular shape when viewed in the direction of the optical axis "L" and thus the lens drive coils 30s and 30t are wound around in a rectangular tube shape. Each of four lens drive magnets 17 is magnetically divided into two pieces in the direction of the optical axis "L" and each of the pieces is magnetized so that its inner face and outer face are magnetized in different poles from each other. Therefore, winding directions of two lens drive coils 30s and 30t are opposite to each other.

The lens drive coil holder 13 which is structured as described above is disposed in the inside of the case 18. As a result, four side parts of the lens drive coils 30s and 30t are respectively faced with the lens drive magnets 17 which are fixed to the inner face of the rectangular tube-shaped body part 18c of the case 18.

(Operation of Lens Drive Mechanism)

In the lens drive module 1a in this embodiment, the movable body 3 is normally located on the imaging element side and, in this state, when an electric current is supplied to the lens drive coils 30s and 30t in a predetermined direction, the lens drive coils 30s and 30t are respectively received with an upward (front side) electro-magnetic force. Therefore, the movable body 3 to which the lens drive coils 30s and 30t are fixed begins to move toward the object to be photographed side (front side). On the other hand, elastic forces which restrict movement of the movable body 3 are generated between the spring member 14t and the front end of the movable body 3 and between the spring member 14s and the rear end of the movable body 3. Therefore, the movable body 3 is stopped when the electro-magnetic force for moving the movable body 3 toward the front side and the elastic forces for restricting movement of the movable body 3 are balanced with each other. In this case, when an amount of the electric current supplied to the lens drive coils 30s and 30t is adjusted according to the elastic forces acting on the movable body 3 by the spring members 14s and 14t, the movable body 3 can be stopped at a desired position.

Further, in the lens drive module 1a, the lens 121 is circular but the lens drive coils 30s and 30t are rectangular regardless of the lens shape, and the lens drive magnets 17 are flat plate-shaped permanent magnets which are respectively fixed to a plurality of inner faces corresponding to sides of the rectangular tube-shaped body part 18c of the case 18 in the support body 2 whose inner peripheral face is formed in a rectangular shape. Therefore, even when there is no sufficient space between the movable body 3 and the support body 2 on the outer peripheral side of the movable body 3, facing area of the lens drive coils 30s and 30t with the lens drive magnets 17 is larger and thus a sufficient thrust force is obtained.

In the lens drive module 1a which is structured as described above, the imaging element 15 and the lens drive coils 30s and 30t are required to be electrically connected with a control section (not shown) of a device main body. Therefore, in this embodiment, the flexible circuit board 300 (see FIGS. 1(a), 1(b) and 1(c)) is disposed on an opposite side to the object to be photographed side with respect to the lens drive module 1a, and the imaging element 15 and the lens drive coils 30s and 30t are electrically connected with wiring patterns which are formed on the flexible circuit board 300.

(Entire Structure of Shake Correction Mechanism)

As shown in FIG. 1(c), the optical unit 200 with shake correcting function in this embodiment is mounted on an optical device 500 such as a cell phone or the like and used for photographing. When an object is to be photographed in the optical device 500, the Z-axis is generally directed horizontally. Therefore, longitudinal shake around the X-axis and lateral shake around the Y-axis may occur due to shake of hand when a shutter is pushed. Accordingly, in this embodiment, a shake correcting function is provided which will be described below with reference to FIG. 4(a) through FIG. 16(c). In the shake correction mechanism, a shake detection sensor is provided in the movable module 1 and it is structured that the movable module 1 which is disposed to be capable of swinging around the X-axis and the Y-axis with respect to the fixed body 210 is swung by a magnetic drive mechanism for shake correction.

Respective structures of a shake correction mechanism which is structured in the optical unit 200 with shake correcting function in this embodiment will be described below in the following order:

Entire structure of the optical unit 200 with shake correcting function . . . FIG. 4(a) through FIG. 7

Detailed structure of the movable module 1 . . . FIG. 4(a) through FIG. 10

Structure of a support mechanism for the movable module 1 . . . FIG. 4(a) through FIG. 5(b) and FIG. 11(a) through FIG. 12(b)

Structure of a moving range restriction mechanism for the movable module 1 . . . FIG. 13(a) through FIG. 14(c)

Figure 4A:
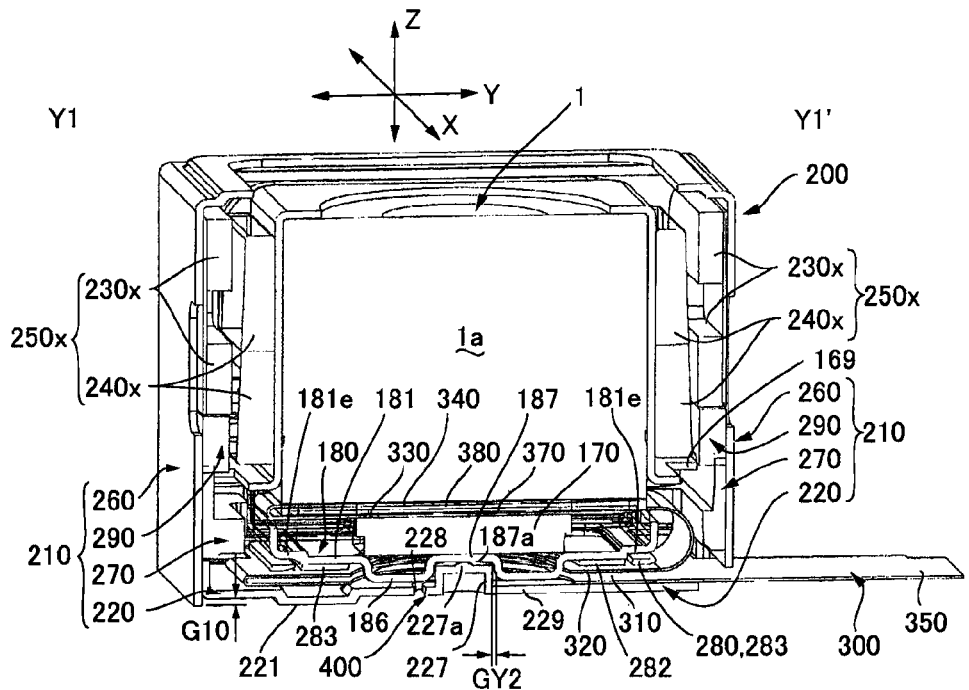
FIGS. 4(a) and 4(b) are explanatory views showing cross sectional structures of an optical unit with shake correcting function in accordance with at least an embodiment of the present invention.
Figure 4B:
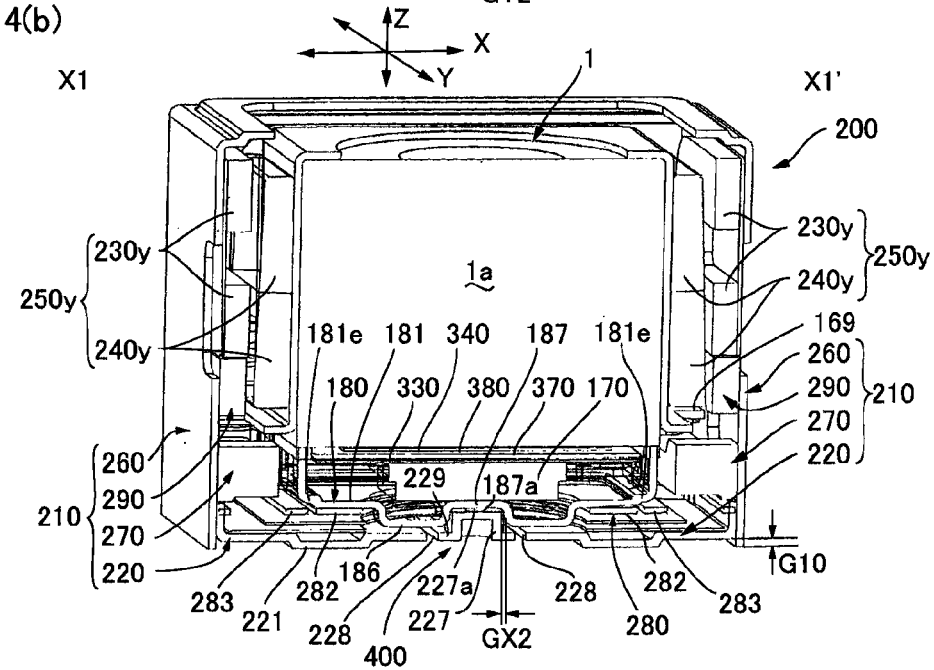
Figure 5A:
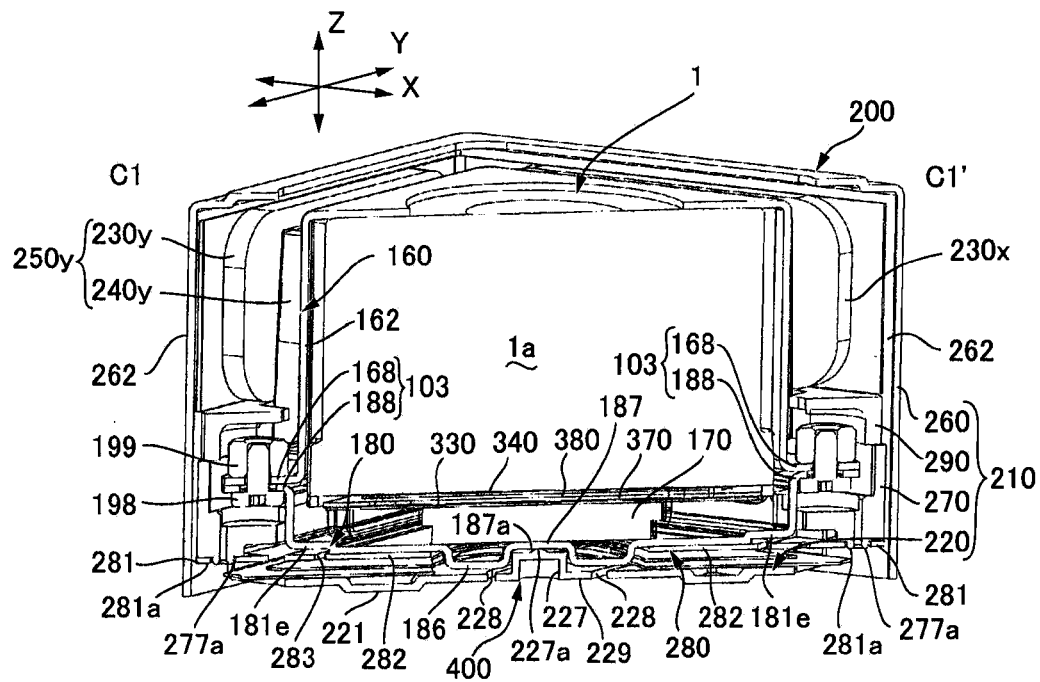
FIGS. 5(a) and 5(b) are explanatory views showing cross sectional structures of an optical unit with shake correcting function in accordance with at least an embodiment of the present invention which are cut at positions different from FIGS. 4(a) and 4(b).
Figure 5B:
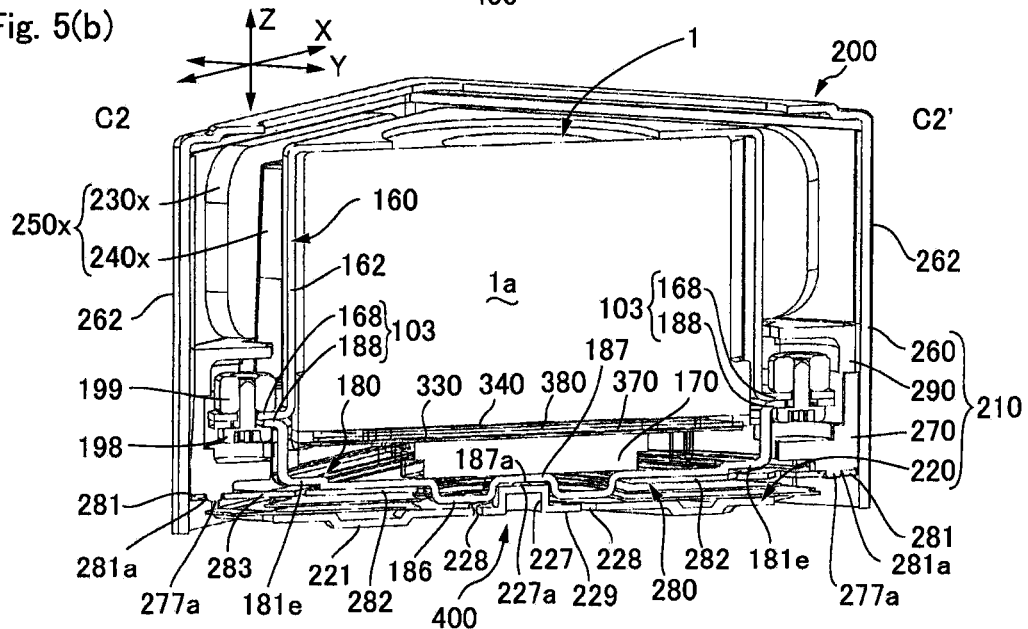
Figure 6:
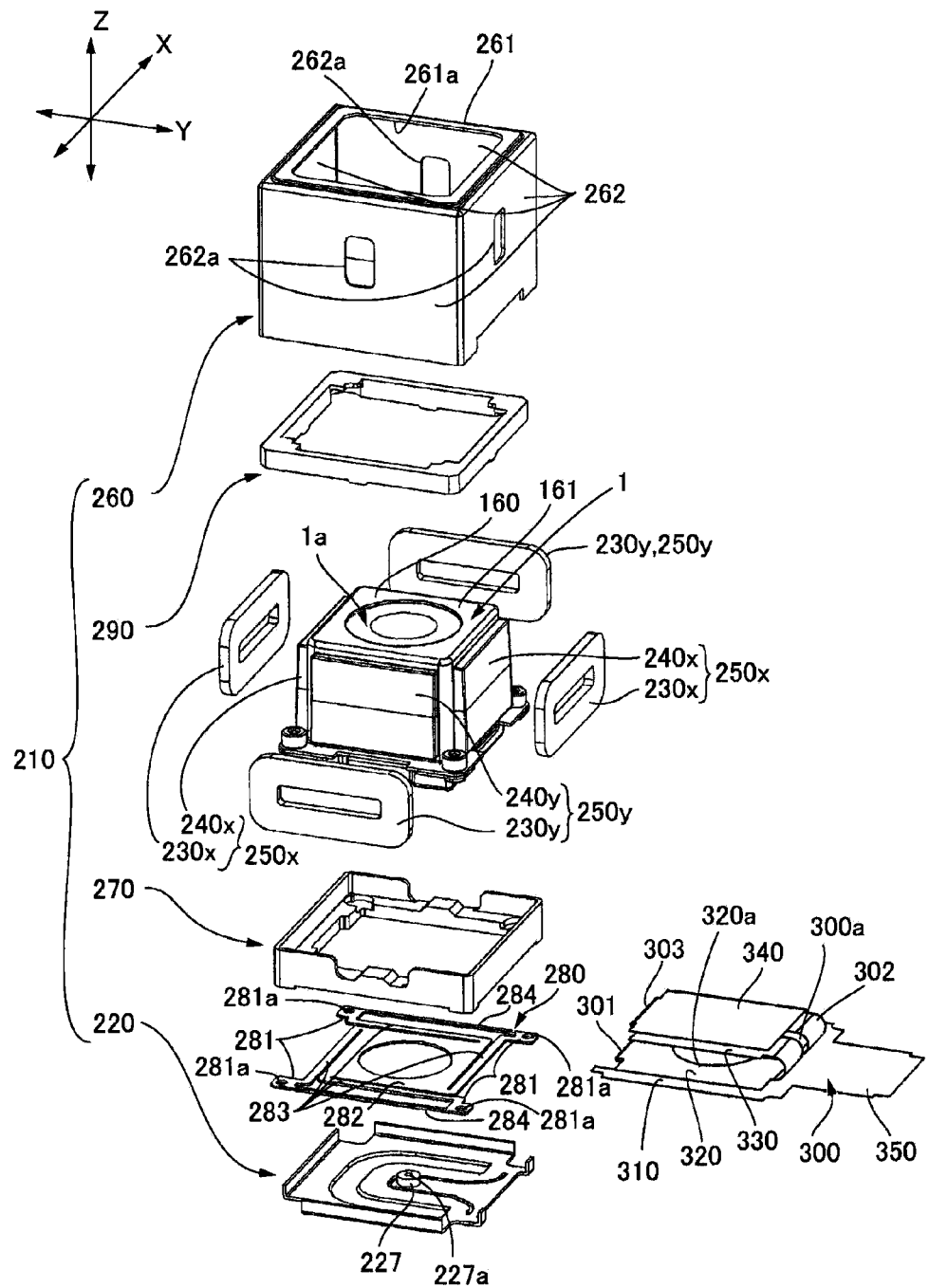
FIG. 6 is an exploded perspective view showing an optical unit with shake correcting function in accordance with at least an embodiment of the present invention which is viewed from a front side.
Figure 7:
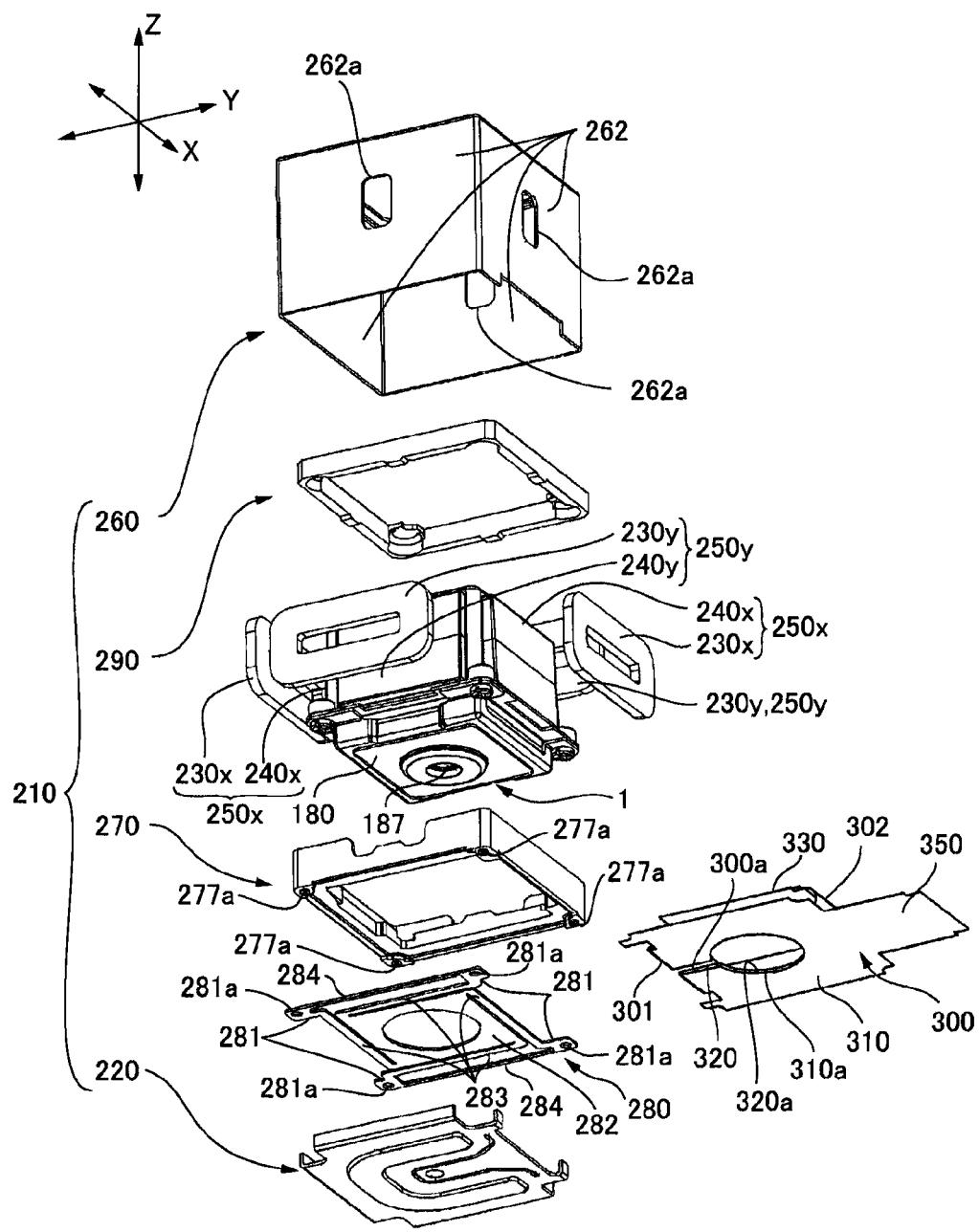
FIG. 7 is an exploded perspective view showing an optical unit with shake correcting function in accordance with at least an embodiment of the present invention which is viewed from a rear side.
Figure 8A:
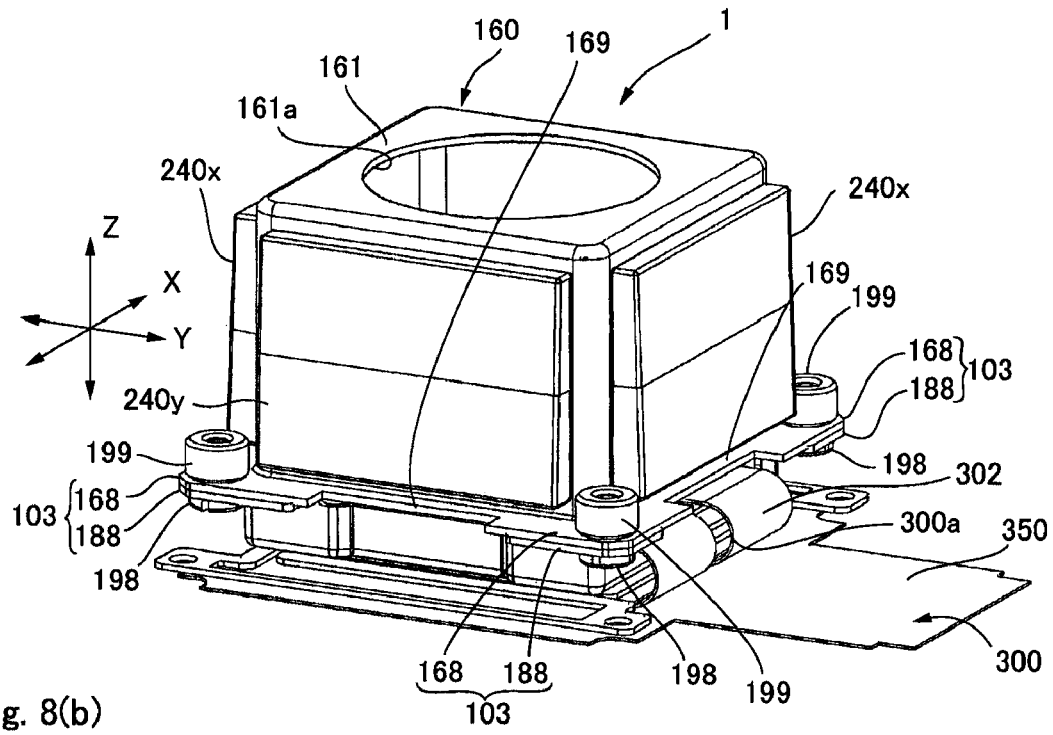
FIGS. 8(a) and 8(b) are explanatory views showing a movable module and members connected to the movable module in an optical unit with shake correcting function in accordance with at least an embodiment of the present invention.
Figure 8B:
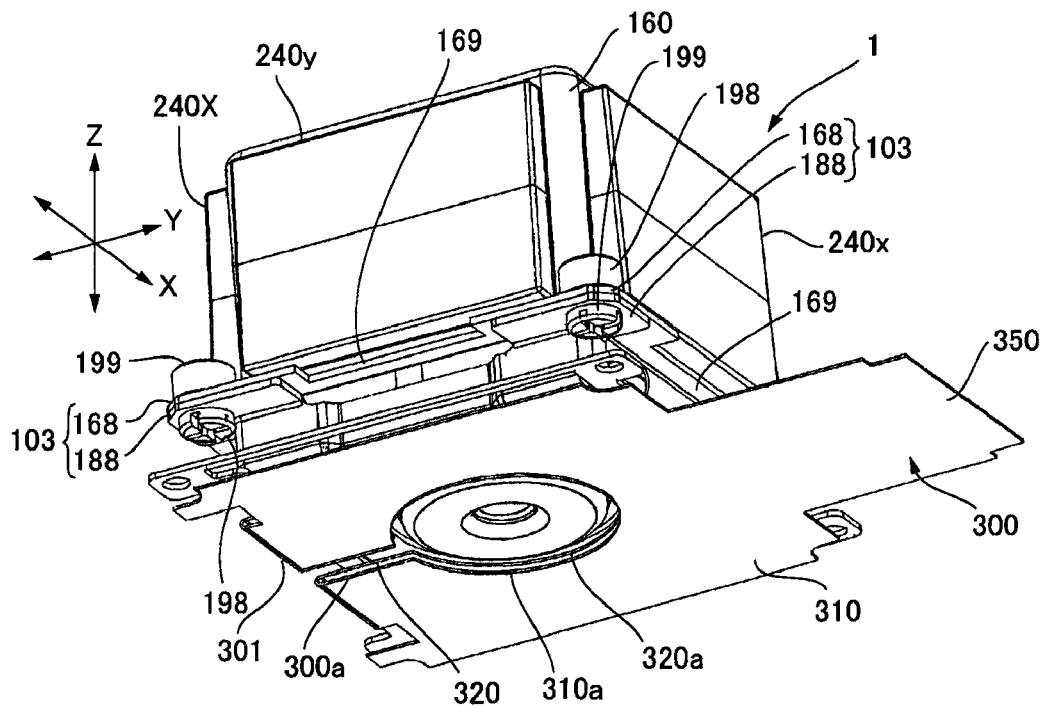

FIGS. 4(a) and 4(b) are explanatory views showing cross sectional structures of the optical unit 200 with shake correcting function to which at least an embodiment of the present invention is applied. FIG. 4(a) is a longitudinal sectional view showing the optical unit 200 with shake correcting function which is cut at a position corresponding to the "Y1-Y1'" line in FIG. 1(a) and FIG. 4(b) is a longitudinal sectional view showing the optical unit 200 which is cut at a position corresponding to the "X1-X1'" line in FIG. 1(a). FIGS. 5(a) and 5(b) are explanatory views showing cross sectional structures of the optical unit 200 with shake correcting function to which at least an embodiment of the present invention is applied and which are cut at different positions from FIGS. 4(a) and 4(b). FIG. 5(a) is a longitudinal sectional view showing the optical unit 200 with shake correcting function which is cut at a position corresponding to the "C1-C1'" line in FIG. 1(a) and FIG. 5(b) is a longitudinal sectional view showing the optical unit 200 which is cut at a position corresponding to the "C2-C2'" line in FIG. 1(a). FIG. 6 is an exploded perspective view showing the optical unit 200 with shake correcting function to which at least an embodiment of the present invention is applied and which is viewed from the front side and FIG. 7 is its exploded perspective view which is viewed from the rear side. FIGS. 8(a) and 8(b) are explanatory views showing the movable module 1 and members connected with the movable module 1 in the optical unit 200 with shake correcting function to which at least an embodiment of the present invention is applied. FIG. 8(a) is a perspective view showing the movable module 1 and members connected with the movable module 1 which are viewed from the front side and FIG. 8(b) is its perspective view which is viewed from the rear side.

As shown in FIG. 4(a) through FIG. 7, in this embodiment, the fixed body 210 is structured so that a base 220, a rear side stopper member 270, a front side stopper member 290 and a fixed cover 260 are sequentially superposed on each other from the rear side (lower side) to the front side (upper side). Detailed structures of these members will be described below. Basically, the base 220 functions to support the movable module 1 to be capable of swinging. The rear side stopper member 270 and the front side stopper member 290 function to prevent an excessive displacement of the movable module 1 which is supported to be capable of swinging. The fixed cover 260 functions as a housing of the optical unit 200 with shake correcting function and functions to hold the shake correction coils 230x and 230y.

The flexible circuit board 300 and a spring member 280 (urging member) shown in FIG. 4(a) through FIG. 8(b) are disposed between the base 220 and the movable module 1. The flexible circuit board 300 and the spring member 280 are connected with the movable module 1. Further, the spring member 280 is also connected to the fixed body 20.

The flexible circuit board 300 functions to electrically connect a shake detection sensor 170 and a shake correction magnetic drive mechanism with the outside. The spring member 280 functions to support the movable module 1 to be capable of swinging and functions to urge the movable module 1 toward the base 220.

(Detail Structure of Movable Module 1 and Arrangement of Shake Detection Sensor 17)

Figure 9:
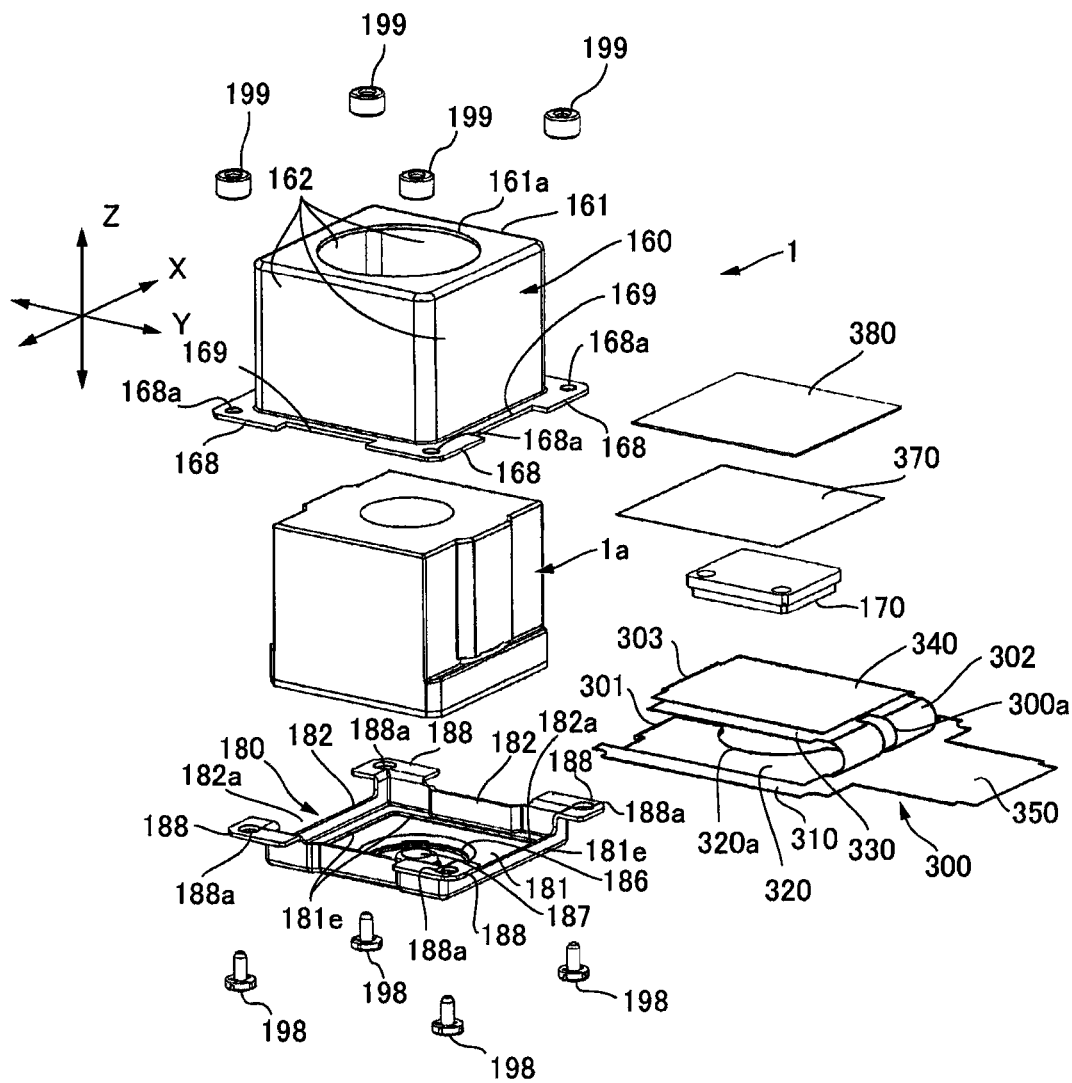
FIG. 9 is an exploded perspective view showing a movable module and a flexible circuit board which are used in an optical unit with shake correcting function in accordance with at least an embodiment of the present invention which are viewed from a front side.
Figure 10:
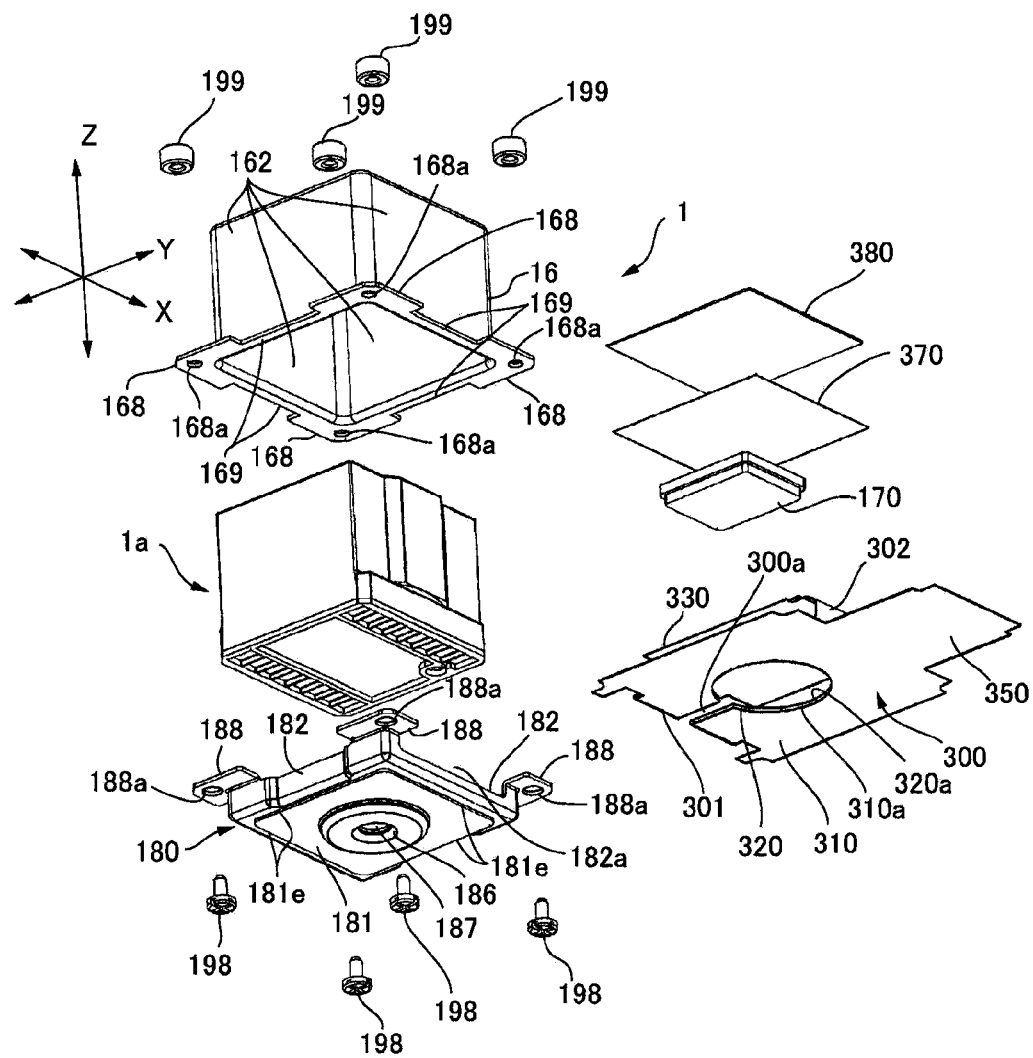
FIG. 10 is an exploded perspective view showing a movable module and a flexible circuit board which are used in an optical unit with shake correcting function in accordance with at least an embodiment of the present invention which are viewed from a rear side.

FIG. 9 is an exploded perspective view showing the movable module 1 and the flexible circuit board 300 which is used in the optical unit 200 with shake correcting function to which at least an embodiment of the present invention is applied and which are viewed from the front side, and FIG. 10 is their exploded perspective view which is viewed from the rear side.

As shown in FIG. 4(a) through FIG. 10, the movable module 1 includes a module cover 160 which holds the lens drive module 1a in its inside. The module cover 160 is provided with a rectangular shape when viewed in the Z-axis direction and four side plate parts 162 are extended from an outer peripheral edge of a top plate part 161 formed in a rectangular shape toward the rear side. The top plate part 161 of the module cover 160 is formed with a circular opening part 161a.

A rear end part of the module cover 160 is opened as an aperture and a metal sensor cover 180 is connected with the rear end part of the module cover 160 so as to cover the aperture. In order to attain this connection, in this embodiment, the rear end part of the module cover 160 is formed with a bent part 169 which is protruded to an outer side. The bent part 169 is provided at four corner portions with module cover side flange parts 168 which are largely projected toward the outer side in a plane intersecting the Z-axis (in this embodiment, in a plane perpendicular to the Z-axis).

The sensor cover 180 is provided with a bottom plate part 181 and four side plate parts 182 which are stood up toward the front side from an outer peripheral edge of the bottom plate part 181. Each of four corner portions at front end edges of the side plate parts 182 is formed with a sensor cover side flange part 188 which is projected toward an outer side in a plane intersecting the Z-axis (in this embodiment, in a plane perpendicular to the Z-axis).

The sensor cover side flange part 188 and the module cover side flange part 168 are formed to superpose on each other in the Z-axis direction. Further, the sensor cover side flange part 188 and the module cover side flange part 168 are formed with small openings 188a and 168a. Therefore, in this embodiment, in a state that shaft parts of screws 198 are penetrated through the small openings 188a and 168a, the shaft parts are fitted to tube-shaped members 199 whose inner peripheral faces are formed with a female screw. When the sensor cover 180 and the module cover 160 are connected with each other as described above, as shown in FIG. 4(a) through FIG. 8(b), the outer peripheral face of the movable module 1 is formed with protruded parts 103 so as to project toward the outer side by using the module cover side flange part 168 and the sensor cover side flange part 188 at four corner portions of the movable module 1.

The side plate parts 182 facing in the Y-axis direction of the sensor cover 180 are formed with a cut-out part 182a at their front end edges. Therefore, in the state that the sensor cover 180 and the module cover 160 are connected with each other, gap spaces which are opened in the Y-axis direction are formed between the sensor cover 180 and the module cover 160. Accordingly, a part of the flexible circuit board 300 is disposed between the sensor cover 180 and the lens drive module 1a and the lead-out part 350 of the flexible circuit board 300 can be extended from the movable module 1 toward one side in the Y-axis direction.

The flexible circuit board 300 is formed in a folded shape where a sheet in a roughly rectangular shape which is extended in the Y-axis direction is bent at three positions in its longitudinal direction (bent portions 301, 302 and 303). Therefore, the flexible circuit board 300 is provided with a lead-out portion 350 extended to the outside, a first flat plate portion 310 which is connected with the lead-out portion 350, a second flat plate portion 320 which is connected with the first flat plate portion 310 through the bent portion 301, a third flat plate portion 330 which is connected with the second flat plate portion 320 through the bent portion 302, and a fourth flat plate portion 340 which is connected with the third flat plate portion 330 through the bent portion 303. The first flat plate portion 310, the second flat plate portion 320, the third flat plate portion 330 and the fourth flat plate portion 340 are formed in a shape sequentially folded from the rear side to the front side in the Z-axis direction. In this embodiment, the bent portions 301 and 303 are bent at an acute angle but the bent portion 302 is circularly curved in a "U"-shape.

In the flexible circuit board 300, the first flat plate portion 310 and the second flat plate portion 320 are disposed on the rear side (lower side) of the sensor cover 180 and the third flat plate portion 330 and the fourth flat plate portion 340 are disposed between the sensor cover 180 and the lens drive module 1a. Therefore, one side of the flexible circuit board 300 with respect to the bent portion 302 is extended into the inside of the movable module 1, and the other side of the flexible circuit board 300 with respect to the bent portion 302 is extended from the movable module 1 to the outside.

In the flexible circuit board 300, the shake detection sensor 170 is mounted on an under face of the third flat plate portion 330 and an under face of the shake detection sensor 170 is adhesively fixed to the sensor cover 180. Therefore, the portion of the flexible circuit board 300 which is extended to the inside of the movable module 1 is displaced with the movable module 1 in an integral manner, and the portion of the flexible circuit board 300 which is extended to the outside from the movable module 1 and is located near the movable module 1 is deformed according to swing operation of the movable module 1.

An upper face of the third flat plate portion 330 is fixed with a metal plate 380 for reinforcement through a flexible double-side tape 370. In this state, the under face side of the shake detection sensor 170 is shielded by the sensor cover 180 and the upper face side of the shake detection sensor 170 is shielded by the metal plate 380. Further, the metal plate 380 is disposed between the shake detection sensor 170 and the imaging element 15 (see FIG. 2(b)) and thus the metal plate 380 also functions as a shield for the under face side of the imaging element 15. The fourth flat plate portion 340 of the flexible circuit board 300 is electrically connected with the imaging element 15, which is described with reference to FIG. 2(b), through the circuit board 154 (double-side circuit board). The lens drive coils 30s and 30t are also electrically connected with the flexible circuit board 300 through the spring pieces 14e and 14f. In this embodiment, the shake detection sensor 170 is a surface mounting type gyro-sensor (angular velocity sensor), which detects two axial angular velocity, preferably detects angular velocities of two axes perpendicular to each other. In order to perform detection, an excitation signal is inputted into the gyro-sensor and a shake of hand is detected on the basis of a phase difference between an output signal and an input signal or the like. Therefore, wrong detection may be occurred in the shake detection sensor 170 when an electromagnetic wave noise enters from the outside and the shake detection sensor 170 itself may also be a source from which an electromagnetic wave noise is generated.

The first flat plate portion 310 and the second flat plate portion 320 of the flexible circuit board 300, which are disposed on the rear side of the sensor cover 180, are formed with circular openings 310a and 320a having a larger diameter. The openings 310a and 320a are cut-out portions for disposing a support mechanism 400 which supports the movable module 1 to be capable of being swung on the rear face side of the sensor cover 180. As described above, in this embodiment, the cut-out part is formed in the flexible circuit board 300 and the flexible circuit board 300 is disposed so as to avoid the support mechanism 400. Therefore, a space between the base 220 and the movable module 1 can be utilized as an arrangement space of the flexible circuit board 300.

Center portions in a widthwise direction of the first flat plate portion 310, the bent portion 301, the second flat plate portion 320 and the bent portion 302 are formed with a slit 300a which is extended in the Y-axis direction. The slit 300a is continuously extended from the opening 310a which is formed in the first flat plate portion 310 to the bent portion 302. Therefore, since the flexible circuit board 300 is formed with the slit 300a and the openings 310a and 320a, the flexible circuit board 300 can be also easily deformed in the widthwise direction (X-axis direction). Further, since the flexible circuit board 300 is symmetrically arranged in the X-axis direction, even when the movable module 1 is swung in any direction around the Y-axis, forces of the flexible circuit board 300 applied to the movable module 1 are equivalent to each other. Therefore, the movable module 1 can be swung appropriately and thus shake correction is performed surely. In addition, the lead-out portion of the flexible circuit board 300 from the movable module 1 is provided with the bent portions 301 and 302 in the Y-axis direction. Therefore, when the movable module 1 is swung around the X-axis, a returning force of the deformed flexible circuit board 300 to its original shape is hard to affect swing of the movable module 1.

(Structure of Support Mechanism 400 and Swing Support Point)

Figure 11A:
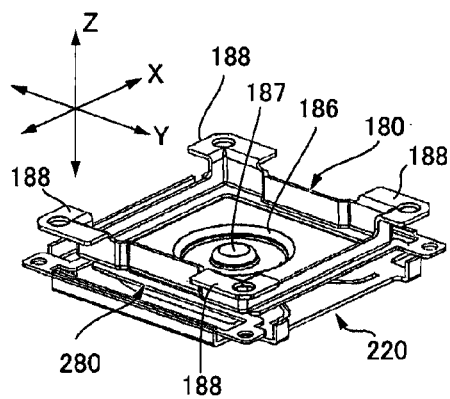
FIGS. 11(a), 11(b), 11(c) and 11(d) are explanatory views showing members structuring a support mechanism and the like in an optical unit with shake correcting function in accordance with at least an embodiment of the present invention.
Figure 11B:
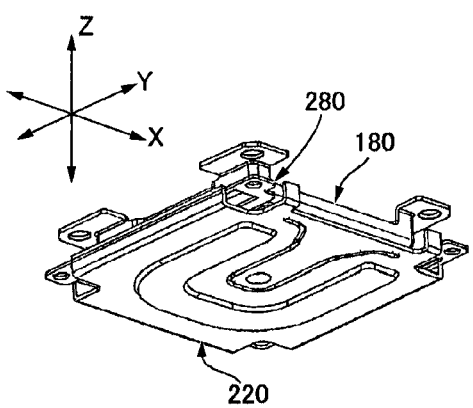
Figure 11C:
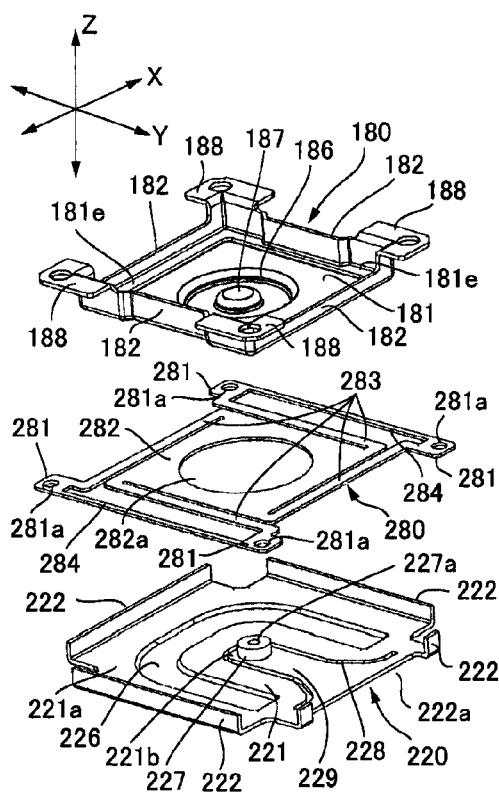
Figure 11D:
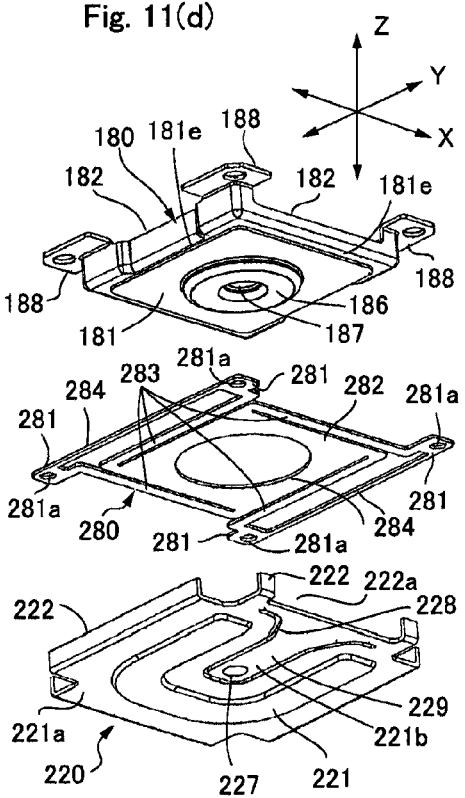
Figure 12A:
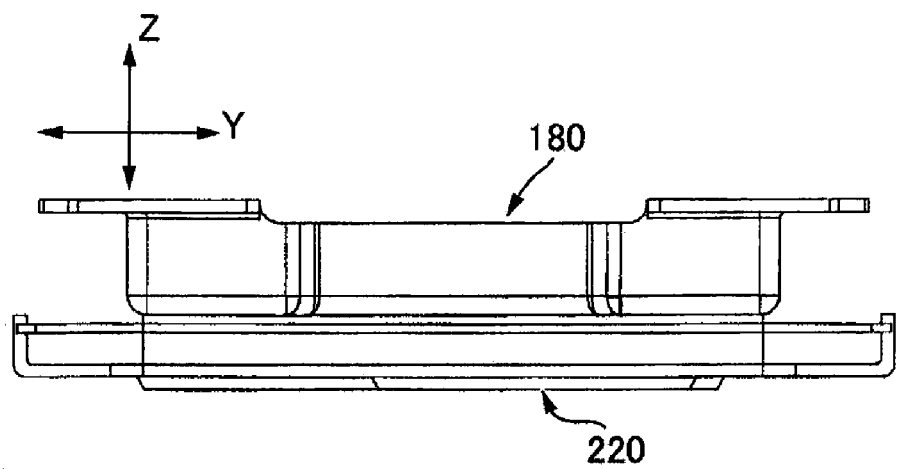
FIG. 12(a) is an explanatory view showing a base, a spring member and a sensor cover in an optical unit with shake correcting function in accordance with at least an embodiment of the present invention which is viewed in an X-axis direction.
Figure 12B:
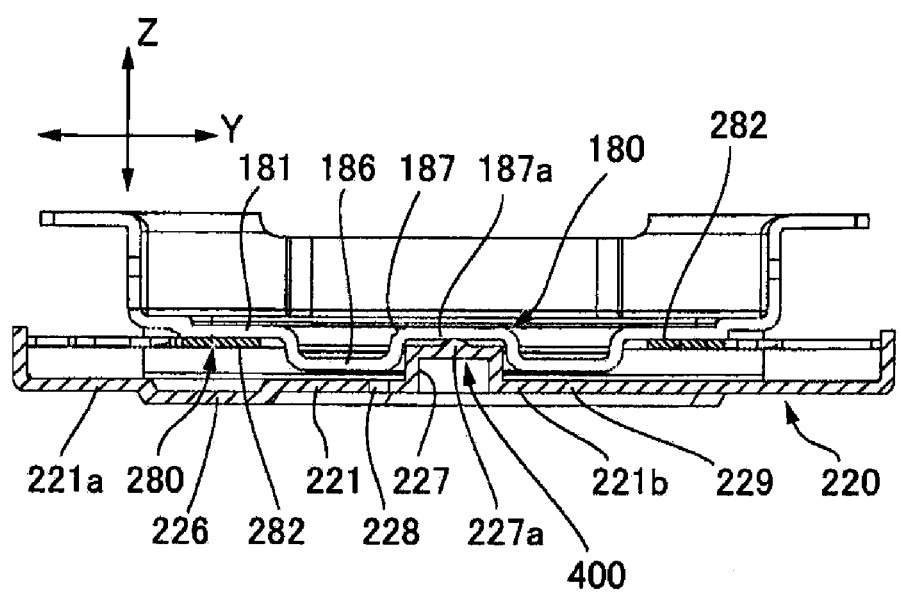
FIG. 12(b) is its sectional view.
Figure 13A:
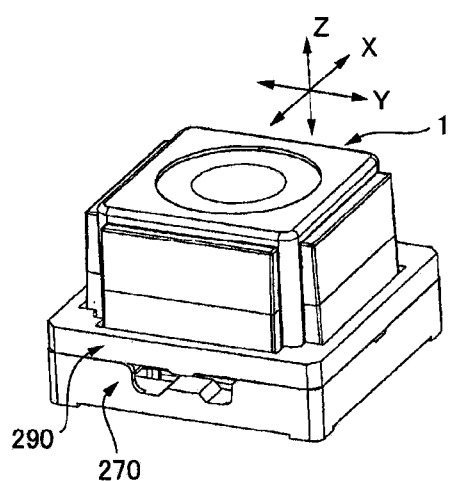
FIGS. 13(a), 13(b), 13(c) and 13(d) are explanatory views showing members for restricting a moving range of the movable module in an optical unit with shake correcting function in accordance with at least an embodiment of the present invention.
Figure 13B:
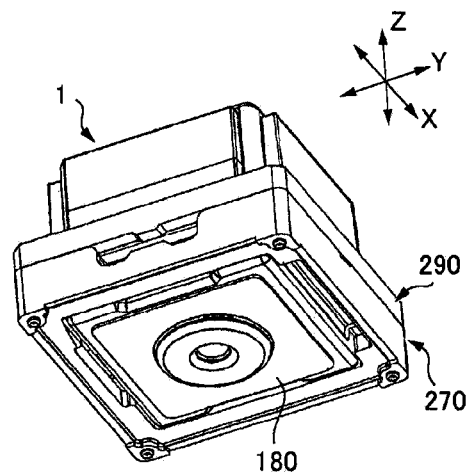
Figure 13C:
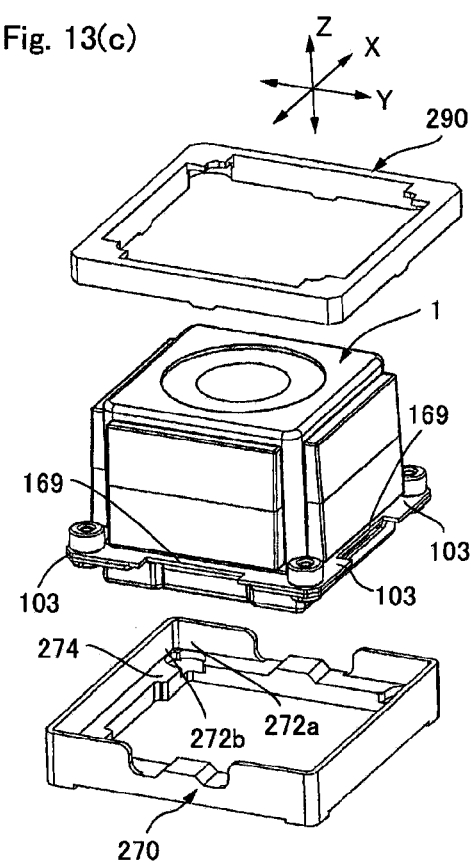
Figure 13D:
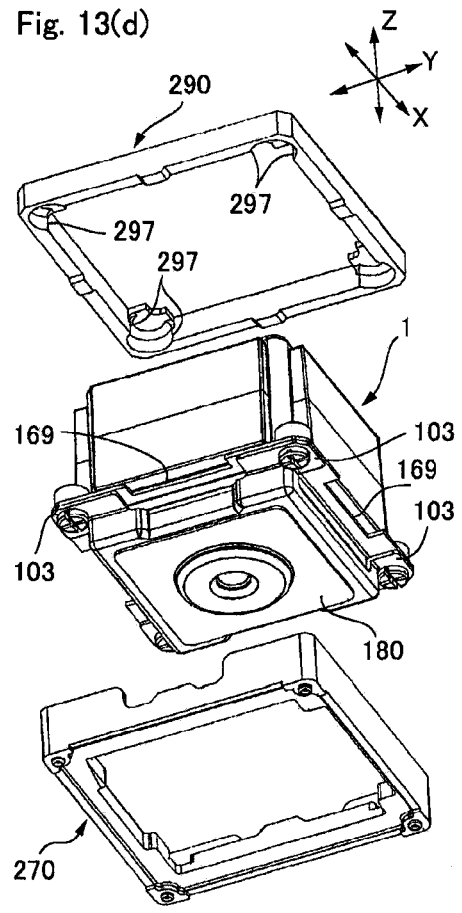

FIGS. 11(a) through 11(d) are explanatory views showing members which structure the support mechanism 400 and the like in the optical unit 200 with shake correcting function to which at least an embodiment of the present invention is applied. FIG. 11(a) is a perspective view showing the base 220, the spring member 280 and the sensor cover 180 in the optical unit 200 with shake correcting function which are viewed from the front side, FIG. 11(b) is their perspective view which is viewed from the rear side, FIG. 11(c) is their exploded perspective view which is viewed from the front side, and FIG. 11(d) is their exploded perspective view which is viewed from the rear side. FIG. 12(a) is an explanatory view showing the base 220, the spring member 280 and the sensor cover 180 in the optical unit 200 with shake correcting function to which at least an embodiment of the present invention is applied and which is viewed in the X-axis direction, and FIG. 12(b) is their sectional view.

The bottom plate part 181 of the sensor cover 180, which is described with reference to FIGS. 4(a) through 5(b), FIG. 9 and FIG. 10, is formed so that, as shown in FIGS. 11(a) through 11(d), when viewed from the front side, a center circular portion 186 is recessed on the rear side, and a recessed part 187 (receiving part for support) is formed at a center portion of the circular portion 186 so as to protrude toward the front side in a bottomed cylindrical shape and so that its under face is opened toward the rear side.

The base 220 which is disposed on the rear side and faces the sensor cover 180 is structured so that four side plate parts 222 are stood up from an outer peripheral edge of the rectangular bottom plate part 221 toward the front side, and one of the side plate parts 222 facing in the Y-axis direction is formed with the cut-out part 222a for extending the flexible circuit board 300 to the outside which is described with reference to FIGS. 9 and 10. A center portion of the bottom plate part 221 of the base 220 is formed with a support protruded part 227 in a bottomed cylindrical shape which is protruded toward the front side (upper side). A front end face of the support protruded part 227 is formed with a small protruded part 227a in a hemispheric shape. Therefore, as shown in FIG. 12(a), when the sensor cover 180 is disposed on the front side (upper side) of the base 220, the support protruded part 227 of the base 220 is fitted to the recessed part 187 of the sensor cover 180 and the small protruded part 227a is abutted with the bottom under face 187a of the recessed part 187 as shown in FIGS. 4(a) through 5(b) and FIG. 12(b).

As described above, in this embodiment, a pivot part (swing support part) is formed between the base 220 of the fixed body 210 and the sensor cover 180 of the movable module 1 by using the bottom under face 187a of the recessed part 187 and the small protruded part 227a of the support protruded part 227. The pivot part structures the support mechanism 400 which enables the movable module 1 to swing with respect to the fixed body 210. In this embodiment, the support mechanism 400 is disposed on the rear side of the shake detection sensor 170 at a position superposed on the shake detection sensor 170 in the Z-axis direction.

In FIGS. 11(a) through 11(d), the base 220 is a press-worked product made of a metal plate. When viewed from the front side (upper side), the bottom plate part 221 is formed with an outer peripheral region 221a and a recessed part 226 which is dented toward the rear side between the center region 221b where the support protruded part 227 is formed and the outer peripheral region 221a. The recessed part 226 is formed to surround three sides of the center region 221b where the support protruded part 227 is formed. Further, the center region 221b of the bottom plate part 221 of the base 220 is formed with a slit 228 which surrounds three sides of the region where the support protruded part 227 is formed. A flat spring part 229 extending in the Y-axis direction is formed by the slit 228. Therefore, the support protruded part 227 is formed at the tip end of the flat spring part 229. Accordingly, when the flat spring part 229 is deformed in the Z-axis direction, the entire support mechanism 400 is displaced in the Z-axis direction.

In this embodiment, the flat spring part 229 is located on a slightly front side with respect to the rear face of the base 220. Therefore, as shown in FIGS. 4(a) and 4(b), the rear face of the flat spring part 229 is located on the front side by a predetermined dimension "G10" with respect to the rear face of the base 220 and the rear end edge of the fixed cover 260.

(Structure of Spring Member 280)

The spring member 280 for urging the movable module 1 toward the base 220 is disposed between the sensor cover 180 of the movable module 1 and the base 220. The spring member 280 generates an urging force in a direction where the bottom under face 187a of the recessed part 187 and the small protruded part 227a of the support protruded part 227 are abutted with each other. The spring member 280 is a flat spring having a rectangular shape in plane and is formed by press working to a metal thin plate made of phosphor bronze, beryllium copper, nonmagnetic SUS steel material or the like, or by etching processing using a photo lithography technique.

Four corner portions of the spring member 280 are formed with a fixed body side connecting part 281 which is connected with the fixed body 210. In this embodiment, the fixed body side connecting parts 281 are fixed to the rear side stopper member 270 shown in FIG. 4(a) through FIG. 7 which is a member structuring the fixed body 210. In this embodiment, small openings 281a are formed in the fixed body side connecting parts 281 of the spring member 280 and small protruded parts 277a are formed in four corner portions on the rear side face of the rear side stopper member 270. Therefore, after the small protruded parts 277a of the rear side stopper member 270 are fitted to the small openings 281a of the spring member 280 and the spring member 280 and the rear side stopper member 270 are positioned to each other, the fixed body side connecting parts 281 are connected with the fixed body 210 by a method such as adhesion, caulking or heating the small projection 277a to be melted.

The center portion of the spring member 280 is formed with a movable module side connecting part 282 in a substantially rectangular shape which is connected with the sensor cover 180 of the movable module 1. A center region of the movable module side connecting part 282 is formed with a circular opening 282a to which a circular portion 186 protruded toward the rear side from the bottom plate part 181 of the sensor cover 180 is fitted. The movable module side connecting part 282 of the spring member 280 is fixed to the rear face of the bottom plate part 181 of the sensor cover 180 by a method such as adhesion.

The spring member 280 is formed in a gimbal spring shape which is provided with four arm parts 283 having a thinner width whose both ends are connected with the center movable module side connecting part 282 and four fixed body side connecting parts 281. In this embodiment, four arm parts 283 are respectively extended in the X-axis direction or the Y-axis direction along side parts of the movable module side connecting part 282. Further, in a state that the spring member 280 is mounted on the optical unit 200 with shake correcting function, the position in the Z-axis direction (direction of optical axis "L") of the movable module side connecting part 282 is the same as the position where the support projection 227 of the base 220 is abutted with the bottom under face 187a of the recessed part 187 of the sensor cover 180. In addition, the movable module side connecting part 282 is located on the front side with respect to the fixed body side connecting parts 281. Therefore, the arm parts 283 urges the movable module 1 toward the base 220.

In this embodiment, each of four arm parts 283 is extended from the fixed body side connecting part 281 in the same circumferential direction and four arm parts 283 are provided with the same shape and size and are disposed with an equal angular distance around the optical axis. Therefore, four arm parts 283 are formed in rotational symmetry at 90 degrees, 180 degrees and 270 degrees. Further, the spring member 280 is provided with the movable module side connecting part 282 which is made of a flat plate portion having a wide area and thus the spring member 280 is connected with the sensor cover 180 with a wide area through the movable module side connecting part 282. Therefore, the spring member 280 generates an urging force in the direction where the bottom under face 187*a* of the recessed part 187 and the small protruded part 227*a* of the support protruded part 227 are abutted with each other and, when an external force is not applied to the movable module 1, the optical axis "L" of the movable module is held in a parallel posture to the Z-axis.

In this embodiment, the first flat plate portion 310 and the second flat plate portion 320 of the flexible circuit board 300, which are described with reference to FIGS. 9 and 10, are disposed between the spring member 280 and the base 220 on the rear side of the sensor cover 180. Therefore, in the spring member 280, two fixed body side connecting parts 281 in the X-axis direction are connected with each other through beam parts 284 but the beam parts 284 in the Y-axis direction are not formed and cut-out parts are formed between two fixed body side connecting part 281. Accordingly, the flexible circuit board 300 can be passed through between the fixed body side connecting parts 281 in one of the Y-axis direction.

Further, in the rear face of the bottom plate part 181 of the sensor cover 180, a portion superposed on the arm parts 283 of the spring member 280 in the Z-axis direction is formed as a recessed part 181*e* which is dented in a direction separated from the arm parts 283 (toward the front side) in comparison with a region where the movable module side connecting part 282 of the spring member 280 is connected. Therefore, a gap space is formed between the bottom plate part 181 of the sensor cover 180 and the arm parts 283. Accordingly, the bottom plate part 181 of the sensor cover 180 is not abutted with the arm parts 283 and, even when the movable module 1 is swung and the spring member 280 is deformed, the bottom plate part 181 of the sensor cover 180 and the arm parts 283 are not abutted with each other.

(Structure of Shake Correction Magnetic Drive Mechanism)

In this embodiment, as shown in FIGS. 4(*a*) through 7, a first magnetic drive mechanism 250*x* for shake correction capable of swinging the movable module 1 around the X-axis with the support mechanism 400 as a supporting point and a second magnetic drive mechanism 250*y* for shake correction capable of swinging the movable module 1 around Y-axis with the support mechanism 400 as a supporting point are structured as a magnetic drive mechanism for shake correction which generates a magnetic drive force for swinging the movable module 1. Structures of the first magnetic drive mechanism 250*x* for shake correction and the second magnetic drive mechanism 250*y* for shake correction will be described below.

In the movable module 1, a shake correction magnet 240*x* (first shake correction magnet) formed in a rectangular plate shape which structures a first magnetic drive mechanism 250*x* for shake correction is held on outer faces of two side plate parts 162 of the module cover 160 facing in the Y-axis direction, and a shake correction magnet 240*y* (second shake correction magnet) formed in a rectangular plate shape which structures a second magnetic drive mechanism 250*y* for shake correction is held on outer faces of the other two side plate parts 162 facing in the X-axis direction of the module cover 160. Each of the shake correction magnets 240*x* and 240*y* is formed in a rectangular flat plate-shaped permanent magnet. In this embodiment, the shake correction magnets 240*x* and 240*y* are structured of two flat plate-shaped permanent magnets which are arranged in the Z-axis direction and, in the flat plate-shaped permanent magnet, its outer face and inner face are magnetized in different poles from each other. Further, two pieces of the flat plate-shaped permanent magnet which are arranged in the Z-axis direction are magnetized in reverse directions. In accordance with an embodiment of the present invention, the shake correction magnets 240*x* and 240*y* may be structured by means of that one piece of permanent magnet is magnetized so as to have two pairs of different polarities.

Further, in the fixed body 210, a shake correction coil 230*x* (first coil for shake correction) which structures a first magnetic drive mechanism 250*x* for shake correction is adhesively fixed to inner faces of two side plate parts 262 of the fixed cover 260 facing in the Y-axis direction, and a shake correction coil 230*y* (second coil for shake correction) which structures a second magnetic drive mechanism 250*y* for shake correction is adhesively fixed to inner faces of the other two side plate parts 262 of the fixed cover 260 facing in the X-axis direction. The shake correction coils 230*x* and 230*y* are respectively faced to the shake correction magnets 240*x* and 240*y*. Further, two effective side parts located in the Z-axis direction of the shake correction coils 230*x* and 230*y* are respectively faced to two pieces arranged in the Z-axis direction of the flat plate-shaped permanent magnet in the shake correction magnets 240*x* and 240*y*. In this embodiment, respective end parts of the shake correction coils 230*x* and 230*y* are electrically connected with the outside through the flexible circuit board 300 or another flexible circuit board. The side plate part 262 of the fixed cover 260 is formed with a small opening part 262*a* which is utilized, for example, to apply an adhesive for reinforcement after the shake correction coils 230*x* and 230*y* have been fixed to the side plate parts 262.

As described above, in this embodiment, the first magnetic drive mechanisms 250*x* for shake correction is structured in a pair at two portions so as to face in the Y-axis direction and superpose the support mechanism 400 therebetween for swinging the movable module 1 around the X-axis. Two shake correction coils 230*x* in the first magnetic drive mechanisms 250*x* for shake correction are electrically connected so as to generate magnetic-drive forces in the movable module 1 in the same direction around the X-axis when energized. Therefore, two first magnetic drive mechanisms 250*x* for shake correction apply moments to the movable module 1 in the same direction around the X-axis passing through the support mechanism 400 when two shake correction coils 230*x* are energized. Further, in this embodiment, the second magnetic drive mechanisms 250*y* for shake correction is structured in a pair at two portions so as to face in the X-axis direction and superpose the support mechanism 400 therebetween for swinging the movable module 1 around the Y-axis. Two shake correction coils 230*y* in the second magnetic drive mechanisms 250*y* for shake correction are electrically connected so as to generate magnetic-drive forces in the movable module 1 in the same direction around the Y-axis when energized. Therefore, two second magnetic drive mechanisms 250*y* for shake correction apply moments to the movable module 1 in the same direction around the Y-axis passing through the support mechanism 400 when two shake correction coils 230*y* are energized.

In this embodiment, the module cover 160 is made of magnetic body and functions as a yoke to the shake correction magnets 240*x* and 240*y*. Further, a rear side end part of the module cover 160 is formed with a small bent part 169 which is bent to the outer side, and the bent part 169 functions to enhance flux concentrating performance.

In a cell phone with a camera on which the optical unit 200 with shake correcting function structured as described above is mounted, the shake detection sensor 170 such as a gyro-sensor is mounted on the movable module 1 to detect a shake at the time of photographing. A control section which is mounted on the cell phone with a camera supplies an electric current to one or both of the shake correction coils 230*x* and the shake correction coils 230*y* based on a detection result in the shake detection sensor 170 and the movable module 1 is swung around one or both of the X-axis and the Y-axis. When these swing operations are synthesized, the movable module 1 can be swung in the entire "X-Y" plane. Therefore, all shakes occurred in a cellular phone with a camera or the like can be corrected surely.

In order to perform shake correction in this embodiment, the shake detection sensor 170 is mounted on the movable module 200 and a control section (not shown) performs a closed loop control in the first magnetic drive mechanism 250x for shake correction and the second magnetic drive mechanism 250y for shake correction so that an angular velocity which is detected by the shake detection sensor 170 becomes zero. Further, the control section (not shown) performs a closed loop control in the first magnetic drive mechanism 250x for shake correction and the second magnetic drive mechanism 250y for shake correction so that an integral value of the angular velocity, i.e., angular displacement which is detected by the shake detection sensor 170 becomes zero.

In this embodiment, the shake detection sensor 170 is mounted on the movable module 1. Therefore, since a shake of the optical axis "L" is directly detected by the shake detection sensor 170, the shake can be corrected with a high degree of accuracy.

Further, since the movable module 1 is swung with the support mechanism 400 structured on the rear side of the movable module 1 as a center, deformation of the flexible circuit board 300 is extremely small. Therefore, the returning force to its original shape when the flexible circuit board 300 is deformed is small and thus the movable module 1 can be swung quickly.

In this embodiment, magnetic center positions in the Z-axis direction of magnetic forces acting on the movable module 1 (center positions of the shake correction magnets 240x and 240y) with the swing support point (pivot part) of the support mechanism 400 as a reference are located on the front side (separated positions) with respect to the center in the Z-axis direction of the movable module 1 and the center in the Z-axis direction of the optical unit 200 with shake correcting function. Therefore, magnetic-drive forces of the first magnetic drive mechanism 250x for shake correction and the second magnetic drive mechanism 250y for shake correction which are required to swing the movable module 1 may be small.

On the other hand, with the swing support point (pivot part) of the support mechanism 400 as a reference, when magnetic center positions in the Z-axis direction of magnetic forces acting on the movable module 1 are located on the rear side (nearer positions) with respect to the center in the Z-axis direction of the movable module 1 and the center in the Z-axis direction of the optical unit 200 with shake correcting function, the movable module 1 can be swung largely with a little displacement and thus responsibility of shake correction is superior.

(Structure of Moving Range Restriction Mechanism for Movable Module 1)

FIGS. 13(*a*) through 13(*d*) are explanatory views showing members for restricting a moving range of the movable module 1 in the optical unit 200 with shake correcting function to which at least an embodiment of the present invention is applied. FIG. 13(*a*) is a perspective view showing a state where the rear side stopper member 270 and the front side stopper member 290 are disposed in the movable module 1 and which is viewed from the front side, FIG. 13(*b*) is their perspective view which is viewed from the rear side, FIG. 13(*c*) is their exploded perspective view which is viewed from the front side, and FIG. 13(*d*) is their exploded perspective view which is viewed from the rear side. FIGS. 14(*a*), 14(*b*) and 14(*c*) are explanatory views showing a mechanism which restricts a moving range of the movable module 1 in the optical unit 200 with shake correcting function to which at least an embodiment of the present invention is applied. FIG. 14(*a*) is a plan view showing a state where the rear side stopper member is disposed in the movable module in the optical unit with shake correcting function to which at least an embodiment of the present invention is applied and which is viewed from the front side, FIG. 14(*b*) is a sectional view showing the optical unit 200 with shake correcting function which is cut by the line "Y2-Y2'" in FIG. 1(*a*) passing near its corner portions, and FIG. 14(*c*) is a sectional view showing the optical unit 200 with shake correcting function which is cut by the line "X2-X2'" in FIG. 1(*a*) passing near its corner portions.

As shown in FIG. 4(*a*) through FIG. 7 and FIGS. 13(*a*) through 13(*d*), in this embodiment, the front side stopper member 290 and the rear side stopper member 270 formed in a rectangular frame shape are disposed around the movable module 1. Moving ranges of the movable module 1 in both directions in the X-axis direction, both directions in the Y-axis direction and both directions in the Z-axis direction, and both directions around the X-axis, both directions around the Y-axis and both directions around the Z-axis are restricted by the front side stopper member 290 and the rear side stopper member 270.

As shown in FIGS. 14(*a*), 14(*b*) and 14(*c*), when viewed from the front side, each of four corner portions of the rear side stopper 270 is provided with an inner wall 272*a* which faces the protruded part 103 of the corner portion of the movable module 1, which projects in the X-axis direction and the Y-axis direction on an outer side, in the X-axis direction through a little gap space "GX1" and an inner wall 272*b* which faces the protruded part 103 on an outer side in the Y-axis direction through a little gap space "GY1". Therefore, moving ranges of the movable module 1 are restricted in both directions in the X-axis direction, both directions in the Y-axis direction, both directions around the X-axis, both directions around the Y-axis and both directions around the Z-axis. In accordance with an embodiment, in the moving ranges of the movable module 1 in both directions in the X-axis direction, both directions in the Y-axis direction, both directions around the X-axis, both directions around the Y-axis and both directions around the Z-axis, when only a part of the moving ranges is to be restricted, a similar structure may be adopted.

Further, as shown in FIGS. 14(*b*) and 14(*c*), the rear side stopper 270 is provided with a plate-like part 274 which faces the protruded part 103 on the rear side in the Z-axis direction. In addition, a corner part 297 formed in a frame portion of the front side stopper 290 faces the protruded part 103 on the front side in the Z-axis direction. Therefore, moving ranges in both directions in the Z-axis direction of the movable module 1 is restricted.

In this embodiment, the front side stopper member 290 and the rear side stopper member 270 are made of resin and thus, different from metal, they are provided with impact absorption performance and vibration absorption performance. Therefore, even when the movable module 1 is abutted with the front side stopper member 290 and the rear side stopper member 270, unnecessary noise and vibration are not generated and vibration does not propagate to the surroundings. In order to attain these effects, at least portions of the front side stopper member 290 and the rear side stopper member 270 which are abutted with the protruded part 103 may be formed of hard rubber. Further, portions of the front side stopper member 290 and the rear side stopper member 270 which are abutted with the protruded part 103 may be stuck with impact absorption material made of rubber or resin. In accordance with an embodiment, in the stopper mechanism, one of the portions to be interfered with each other is required to have impact absorption property and thus the portion of the movable module 1 which is interfered with the fixed body 210 may be made of rubber or resin, or impact absorption material made of rubber or resin may be stuck to the portion.

As described above, in this embodiment, a stopper mechanism is structured which restricts moving ranges of the movable module 1 in both directions in the X-axis direction, both directions in the Y-axis direction, both directions in the Z-axis direction, both directions around the X-axis, both directions around the Y-axis and both directions around the Z-axis by using the projections 103, the rear side stopper 270 and the front side stopper 290 and by utilizing a narrow free space in the Z-axis direction which is formed between the positions in the Z-axis direction of the shake correction magnets 240x and 240y and the shake correction coils 230x and 230y and the position in the Z-axis direction of the support mechanism 400.

Further, in the support mechanism 400 shown in FIGS. 4(a) through 5(b) and FIGS. 12(a) and 12(b), the support protruded part 227 of the base 220 is fitted into the recessed part 187 of the sensor cover 180 and, in this embodiment, moving ranges of the movable module 1 are restricted in both directions in the X-axis direction and both directions in the Y-axis direction by the support mechanism 400. In other words, as shown in FIGS. 4(a) and 4(b), a slightly gap space "GX2" is formed in the X-axis direction and a slightly gap space "GY2" is formed in the Y-axis direction between the outer peripheral face of the support protruded part 227 and the inner peripheral face of the recessed part 187.

In addition, in the support mechanism 400 shown in FIG. 4(a) through FIG. 5(b) and FIGS. 12(a) and 12(b), the small protruded part 227a of the support protruded part 227 of the base 220 is abutted with the bottom under face 187a of the recessed part 187. Therefore, displacement toward the rear side in the Z-axis direction of the movable module 1 is also restricted by the support mechanism 400. In this embodiment, when the movable module 1 is rapidly displaced toward the rear side in the Z-axis direction by an impact such as dropping, a load acting between the small protruded part 227a and the bottom under face 187a of the recessed part 187 is concentrated until the protruded part 103 of the movable module 1 is abutted with the plate-like part 274 of the rear side stopper 270. Therefore, the small protruded part 227a or the bottom under face 187a of the recessed part 187 may be deformed. However, in this embodiment, the support protruded part 227 is formed in the tip end part of the flat spring part 229 which is formed in the base 220. Therefore, when the movable module 1 is displaced toward the rear side in the Z-axis direction, the entire support mechanism 400 is displaced in the Z-axis direction. Therefore, even when a load is concentrated on the small protruded part 227a and the bottom under face 187a of the recessed part 187 due to impact such as dropping, the small protruded part 227a and the bottom under face 187a of the recessed part 187 are prevented from being deformed.

In this embodiment, as shown in FIGS. 4(a) and 4(b), the flat spring part 229 is located toward the front side by the predetermined dimension "G10" with respect to the rear face of the base 220 and the rear end edge of the fixed cover 260. Therefore, even when the movable module 1 is rapidly displaced toward the rear side in the Z-axis direction due to impact such as dropping to cause the flat spring part 229 to displace toward the rear side, the flat spring part 229 does not project toward the rear side from the rear face of the base 220 and the rear end edge of the fixed cover 260.

(First Manufacturing Method for Optical Unit 200 with Shake Correcting Function)

Figure 14A:
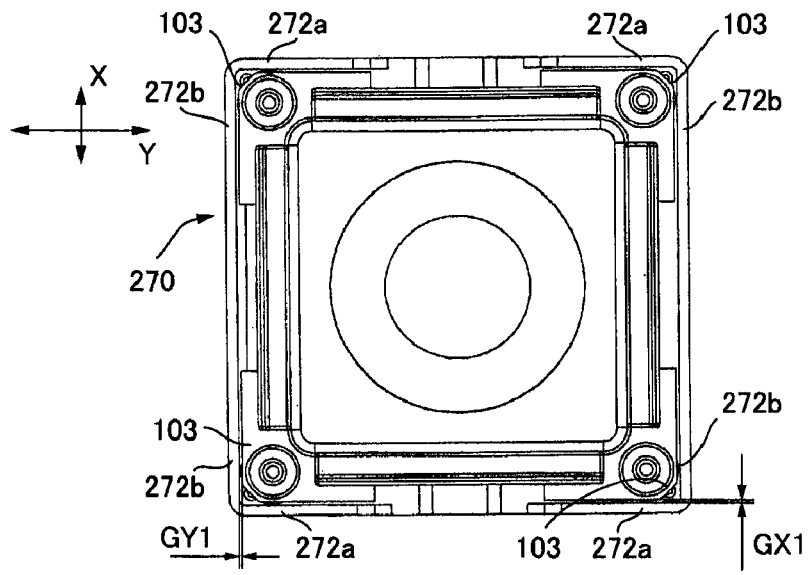
FIGS. 14(a), 14(b) and 14(c) are explanatory views showing a mechanism for restricting a moving range of the movable module in an optical unit with shake correcting function in accordance with at least an embodiment of the present invention.
Figure 14B:
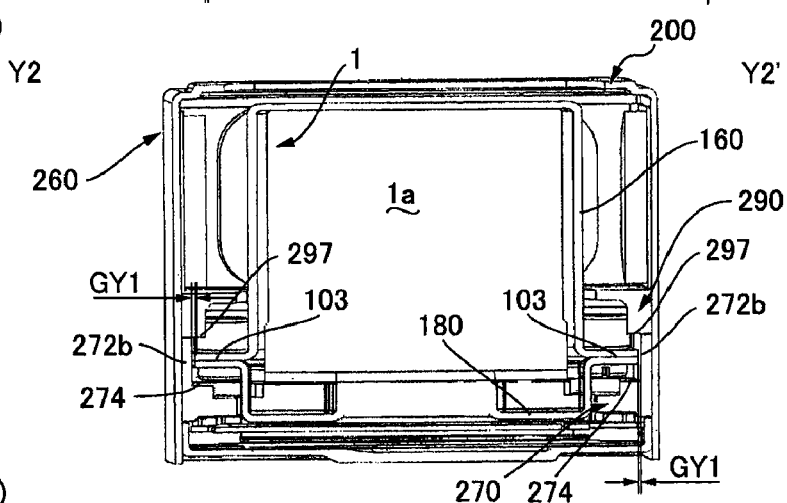
Figure 14C:
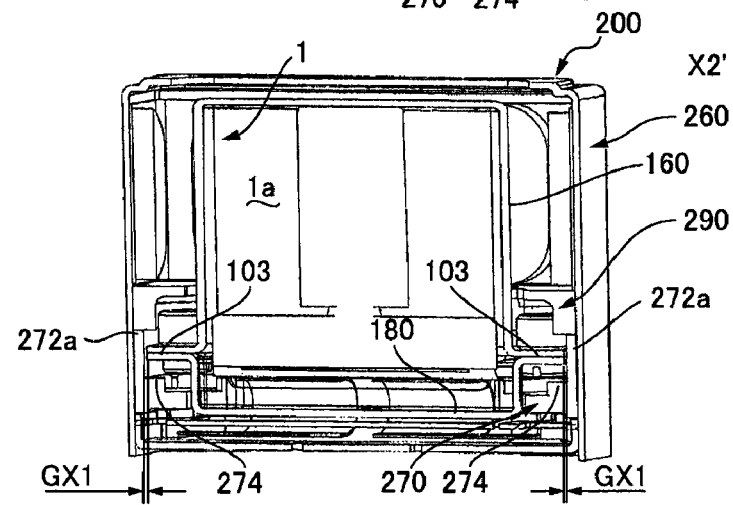

When portions relating to the stopper mechanism are to be assembled in the manufacturing method for the optical unit 200 with shake correcting function in this embodiment, first, the sensor cover 180 used in the movable module 1 is disposed so as to be separated from the rear side stopper member 270 used in the fixed body 210 through a predetermined gap space (gap spaces "GX1" and "GY1" shown in FIGS. 14(a), 14(b) and 14(c)). In this case, the gap space is monitored by using an image processing apparatus or the like.

Next, the spring member 280 is attached to the rear side stopper member 270 (fixed body 210) and the movable module 1. In this case, when a sufficient clearance is secured between the small projection 277a of the rear side stopper member 270 and the small hole 281a of the spring member 280, dimensional errors of the respective members can be absorbed. Further, a flat plate portion of the spring member 280 and a flat plate portion of the sensor cover 180 are connected with each other. Therefore, when relative positions of the movable module side connecting part 282 of the spring member 280 and the sensor cover 180 are adjusted, dimensional errors of the respective members can be also absorbed.

According to this method, a predetermined gap space can be secured between the movable module 1 and the fixed body 210 and thus the stopper mechanism can be structured with a high degree of accuracy.

(Second Manufacturing Method of Optical Unit 200 with Shake Correcting Function)

In order to manufacture the optical unit 200 with shake correcting function in this embodiment, after the sensor cover 180 used in the movable module 1 and the spring member 280 have been connected with each other, the movable module 1 is disposed so as to be separated from the rear side stopper member 270 used in the fixed body 210 through a predetermined gap space (gap spaces "GX1" and "GY1" shown in FIGS. 14(a), 14(b) and 14(c)). Also in this case, the gap space is monitored by using an image processing apparatus or the like. After that, the fixed body 210 and the spring member 280 are connected with each other. In this case, when a sufficient clearance is secured between the small projection 277a of the rear side stopper member 270 and the small hole 281a of the spring member 280, dimensional errors of the respective members can be absorbed. According to this method, a predetermined gap space can be secured between the movable module 1 and the fixed body 210 and thus the stopper mechanism can be structured with a high degree of accuracy.

(Third Manufacturing Method of Optical Unit 200 with Shake Correcting Function)

In order to manufacture the optical unit 200 with shake correcting function in this embodiment, after the rear side stopper member 270 used in the fixed body 210 and the spring member 280 have been connected with each other, the movable module 1 is disposed so as to be separated from the fixed body 210 through a predetermined gap space (gap spaces "GX1" and "GY1" shown in FIGS. 14(a), 14(b) and 14(c)). Also in this case, the gap space is monitored by using an image processing apparatus or the like. After that, the movable module 1 and the spring member 280 are connected with each other. In this case, a flat plate portion of the spring member 280 and a flat plate portion of the sensor cover 180 are connected with each other. Therefore, when relative positions of the movable module side connecting part 282 of the spring member 280 and the sensor cover 180 are adjusted, dimensional errors of the respective members can be absorbed. According to this method, a predetermined gap space can be secured between the movable module 1 and the fixed body 210 and thus the stopper mechanism can be structured with a high degree of accuracy.

(Principal Effects in this Embodiment)

As described above, in the optical unit 200 with shake correcting function in this embodiment, the first magnetic drive mechanisms 250x for shake correction is disposed in a pair at two portions interposing the support protruded part 227 in the Y-axis direction, and the second magnetic drive mechanisms 250y for shake correction is disposed in a pair at two portions interposing the support protruded part 227 in the X-axis direction. Further, two first magnetic drive mechanism 250x for shake correction generate magnetic forces to make the movable module 1 swing in the same direction and two second magnetic drive mechanism 250y for shake correction generate magnetic forces to make the movable module 1 swing in the same direction. Therefore, different from a structure that the first magnetic drive mechanism 250x for shake correction is disposed only one side of the support protruded part 227 or that the second magnetic drive mechanism 250y for shake correction is disposed only one side of the support protruded part 227, drive ability is stable and thus shake can be corrected with a high degree of accuracy. For example, when positional relationship between the shake correction magnet 240x and the shake correction coil 230x is displaced in a direction such that the magnetic-drive force becomes smaller in one of two first magnetic drive mechanisms 250x for shake correction, in the other first magnetic drive mechanism 250x for shake correction, positional relationship between the other shake correction magnet 240x and the other shake correction coil 230x is displaced in a direction so as to correct the above-mentioned positional displacement, in other words, the other positional relationship is displaced in a direction so that the magnetic-drive force becomes larger. Therefore, drive ability of the first magnetic drive mechanism 250x for shake correction is stable. This operation is similarly performed in the second magnetic drive mechanism 250y for shake correction.

Further, the shake detection sensor 170 is mounted on the movable module 1 and thus a shake of the optical axis "L" is directly detected by the shake detection sensor 170. Therefore, a shake by hand of the movable module 1 can be corrected with a high degree of accuracy. When the shake detection sensor 170 is mounted on the movable module 1, the structure of the movable module 1 for leading out the flexible circuit board 300 becomes complicated but, in this embodiment, since the module cover 160 and the sensor cover 180 are used in the movable module 1, assembling of the movable module 1 is easy. Further, in order to connect the module cover 160 with the sensor cover 180, the module cover side flange part 168 and the sensor cover side flange part 188 which are protruded from the module cover 160 and the sensor cover 180 to the outer side are utilized and thus connection and detaching of the module cover 160 with the sensor cover 180 are easy. Therefore, assembling of the movable module 1 is easy. Further, even when a malfunction has occurred at the time of assembling of the movable module 1, it is easy to disassemble the movable module 1 for collecting and reusing the expensive shake detection sensor 170.

Further, in this embodiment, the module cover side flange part 168 and the sensor cover side flange part 188 are detachably connected with each other by the screw 198. Therefore, it is further easy to disassemble the movable module 1 for collecting and reusing the shake detection sensor 170. In addition, the shaft part of the screw 198 is engaged with the tube-shaped member 199 whose inner periphery is provided with a threaded hole to which the screw 198 is threadedly attached. Therefore, threaded holes are not required to form the module cover side flange part 168 and the sensor cover side flange part 188 and thus the thickness of a plate for the module cover side flange part 168 and the sensor cover side flange part 188 can be made thinner. In other words, since the thickness of a plate for the module cover 160 and the sensor cover 180 can be made thinner, the size and the weight of the movable module 1 can be reduced.

Further, the movable module 1 is provided with a rectangular shape when viewed in the direction of the optical axis "L" and the module cover side flange part 168 and the sensor cover side flange part 188 are protruded at corner portions of the rectangular shape. Therefore, the module cover side flange part 168 and the sensor cover side flange part 188 are not required to be connected with each other at portions corresponding to the side parts of the movable module 1. Accordingly, the shake correction magnetic drive mechanism (first shake correction magnetic drive mechanism 250x and second shake correction magnetic drive mechanism 250y) is disposed by utilizing the portions corresponding to the side parts of the movable module 1.

In addition, the protruded part 103 is formed on the outer side of the movable module 1 by utilizing the module cover side flange part 168 and the sensor cover side flange part 188. Therefore, the stopper mechanism is structured which restricts moving ranges of the movable module 1 in both directions in the X-axis direction, both directions in the Y-axis direction, both directions in the Z-axis direction, both directions around the X-axis, both directions around the Y-axis and both directions around the Z-axis by utilizing the protruded part 103 and the front side stopper member 290 and the rear side stopper member 270. Therefore, since the movable module 1 is not displaced excessively, plastic deformation and the like of the spring member 280 is prevented. Further, the protruded part 103 is formed in a two-pieces structure of the module cover side flange part 168 and the sensor cover side flange part 188 and thus the protruded part 103 is provided with a sufficient strength for structuring the stopper mechanism. Therefore, the thickness of a plate for the module cover side flange part 168 and the sensor cover side flange part 188 and, in addition, the thickness of a plate for the module cover 160 and the sensor cover 180 can be made thinner, the size and the weight of the movable module 1 can be reduced.

Especially, in this embodiment, the stopper mechanism is structured by utilizing the protruded parts 103 which are protruded outer sides at corner portions of the movable module 1. Further, moving amounts at the corner portions are the maximum when the movable module 1 is displaced around the X-axis, around the Y-axis and around the Z-axis. Therefore, a large error is permitted at the corner portion in the dimension of the gap space between the protruded part 103 and the fixed body 210 (front side stopper member 290 and rear side stopper member 270) and thus assembling is easy and the moving range can be set accurately.

Further, in order that the movable module 1 is set to be capable of swinging, the support mechanism 400 provided with a pivot part is structured between the base 220 of the fixed body 210 and the sensor cover 180 of the movable module 1 and thus the movable module 1 is prevented from displacing in the Z-axis direction. Further, the flat spring in a gimbal spring shape which is used as the spring member 280 is provided with the long arm parts 283. Therefore, linearity between the deformed amount (displaced amount) and the spring force is high and thus shake correction of the movable module is easily performed.

In addition, the sensor cover 180 is made of metal and the rear side of the shake detection sensor 170 is shielded. Further, the metal plate 380 (shield member) is disposed between the shake detection sensor 170 and the imaging element 15 and functions to shield the under face side of the imaging element 15. Therefore, occurrence of abnormality due to electromagnetic wave noise intruded from the outside into the shake detection sensor 170 or occurrence of abnormality due to electromagnetic wave noise emitted from the shake detection sensor 170 are prevented surely.

Further, the shake detection sensor 170 is disposed on the rear side end part of the movable module 1 and the metal sensor cover 180 is attached to the movable module 1 so as to cover the shake detection sensor 170 on the rear side and thus the sensor cover 180 structures the last end part of the movable module 1. Therefore, the metal sensor cover 180 functions as a shield member and, in addition, used for other functions such as a support part (recessed part 187) for structuring the support mechanism 400 for the movable module 1 and a connecting part with the spring member 280. Accordingly, occurrence of abnormality due to electromagnetic wave noise intruded from the outside into the shake detection sensor 170 or occurrence of abnormality due to electromagnetic wave noise emitted from the shake detection sensor 170 are prevented surely with a small number of part items.

In addition, in this embodiment, in each of the first shake correction magnetic drive mechanism 250x and the second shake correction magnetic drive mechanism 250y, magnets (shake correction magnets 240x and 240y) are held on the movable module 1 which is the movable body, and coils (shake correction coils 230x and 230y) are held on the fixed body 210. Therefore, the small number of wiring lines for the movable module 1 which is the movable body is required and thus wiring structure can be simplified. Further, when the shake correction coils 230x and 230y are held by the fixed body 210, the winding number of the shake correction coils 230x and 230y can be increased and thus a large driving force is attained.

First Another Embodiment of Stopper Mechanism

Figure 15A:
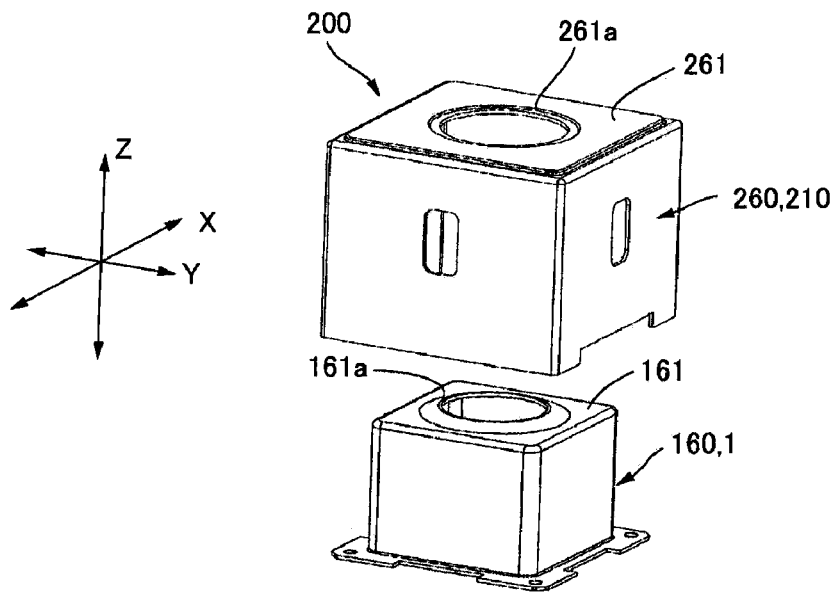
FIGS. 15(a), 15(b) and 15(c) are explanatory views showing a first another embodiment of a stopper mechanism in an optical unit with shake correcting function in accordance with at least an embodiment of the present invention.
Figure 15B:
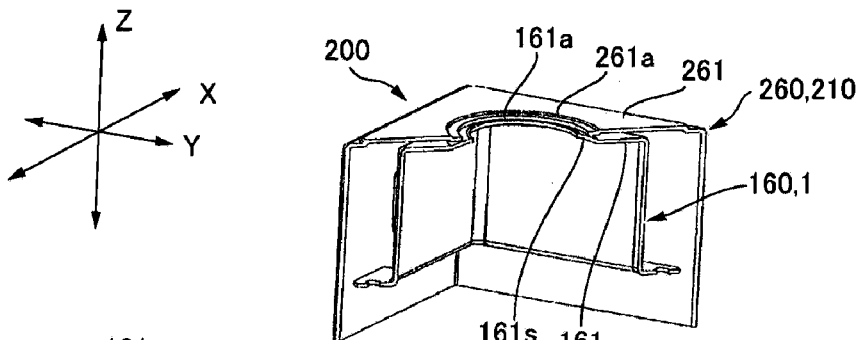
Figure 15C:
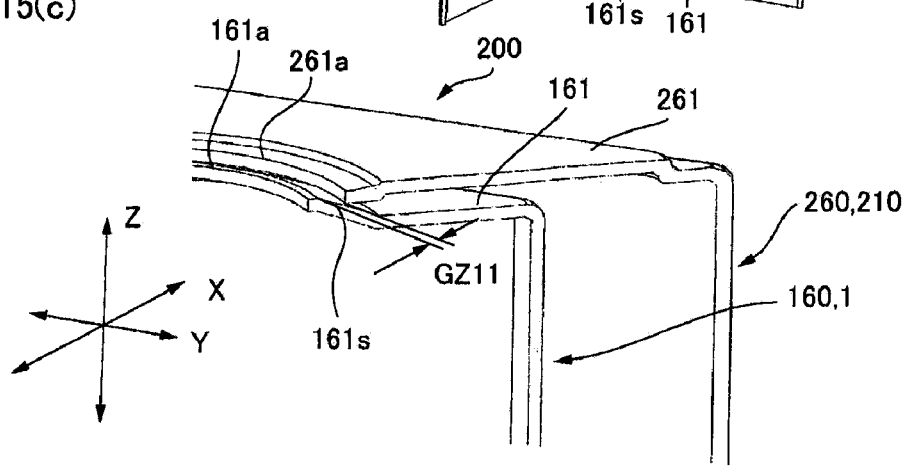

FIGS. 15(a), 15(b) and 15(c) are explanatory views showing a first another embodiment of a stopper mechanism of the optical unit 200 with shake correcting function to which at least an embodiment of the present invention is applied. FIG. 15(a) is an exploded perspective view showing the fixed cover 260 and the module cover 160 which is viewed from the front side in the Z-axis direction, and FIG. 15(b) is an cross-sectional view showing the fixed cover 260 and the module cover 160 and FIG. 15(c) is an enlarged cross-sectional view showing portions structuring the stopper mechanism. Basic structures of the first anther embodiment and another embodiments described below are the same as the structure which is described with reference to FIG. 1(a) through FIG. 14(c). Therefore, the same reference signs are used in common portions in the drawing and their descriptions are omitted.

As shown in FIGS. 15(a), 15(b) and 15(c), in this embodiment, an opening part 261a which is formed in the top plate part 261 of the fixed cover 260 is formed in a slightly larger circular hole than an opening part 161a which is formed in the top plate part 161 of the module cover 160. Therefore, the top plate part 261 of the fixed cover 260 is covered on the front side in the Z-axis direction to the top plate part 161 of the module cover 160. Accordingly, in the optical unit 200 with shake correcting function 200 in this embodiment, the top plate parts 161 and 261 are utilized as the stopper mechanism which restricts the moving range of the movable module 1 to the front side in the Z-axis direction.

Further, a portion of the top plate part 161 of the module cover 160 which faces a portion in the vicinity of an opening edge of the top plate part 261 of the fixed cover 260 through a gap space "GZ11" is formed in a circular arc face 161s with the swing support point of the movable module 1 (pivot part structuring the support mechanism 400) as a center and the circular arc face 161s functions as a stopper which is to be abutted with the portion in the vicinity of the opening edge of the top plate part 261. Therefore, even when the movable module 1 is inclined, the moving range of the movable module 1 to the front side in the Z-axis direction can be restricted accurately. The circular arc face 161s of the module cover 160 may be formed by press working. However, a structure or the like may be adopted in which impact absorption material made of resin or hard rubber is stuck on the module cover 160. Further, in a case that the fixed cover 260 is utilized as the stopper, at least a portion of the fixed cover 260 which is abutted with the circular arc face 161s may be formed by press working. Further, a structure or the like may be adopted in which impact absorption material made of resin or hard rubber is stuck on the fixed cover 260.

Second Another Embodiment of Stopper Mechanism

Figure 16A:
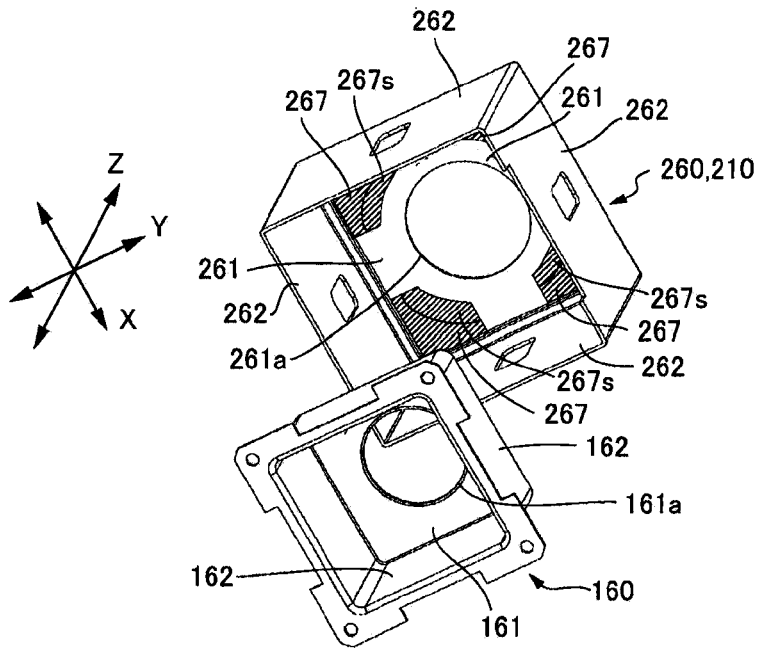
FIGS. 16(a), 16(b) and 16(c) are explanatory views showing a second another embodiment of a stopper mechanism in an optical unit with shake correcting function in accordance with at least an embodiment of the present invention.
Figure 16B:
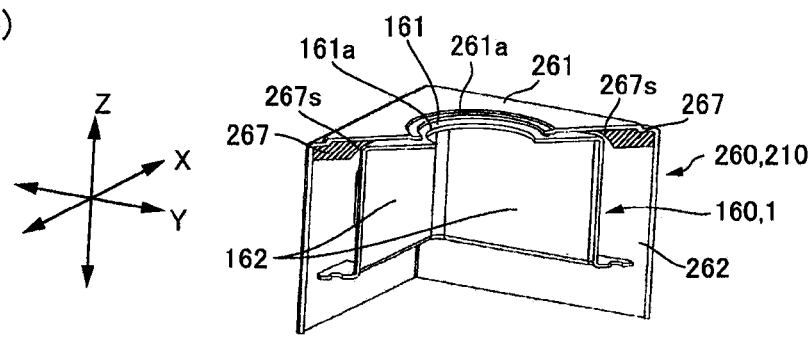
Figure 16C:
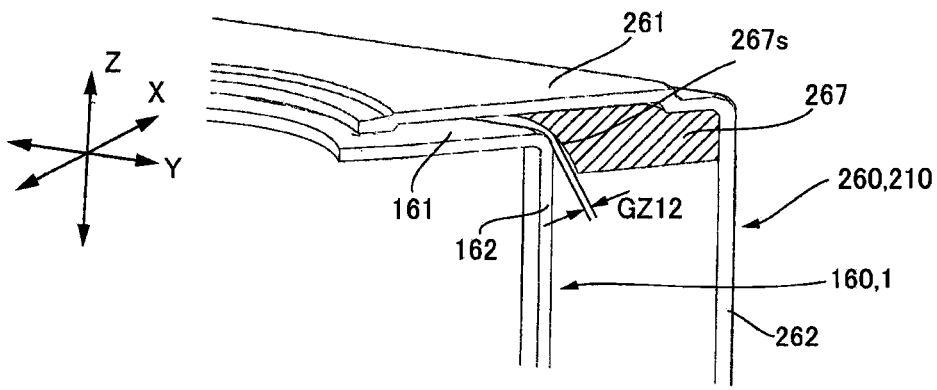

FIGS. 16(a), 16(b) and 16(c) are explanatory views showing a second another embodiment of a stopper mechanism of the optical unit 200 with shake correcting function to which at least an embodiment of the present invention is applied. FIG. 16(a) is an exploded perspective view showing the fixed cover 260 and the module cover 160 which is viewed from the rear side in the Z-axis direction, and FIG. 16(b) is an cross-sectional view showing the fixed cover 260 and the module cover 160 and FIG. 16(c) is an enlarged cross-sectional view showing portions structuring the stopper mechanism.

As shown in FIGS. 16(a), 16(b) and 16(c), in the optical unit 200 with shake correcting function 200 in this embodiment, a recessed corner portion on an inner side of the fixed cover 260 where a corner of the top plate part 261 and a corner of the side plate part 262 are connected with each other and a projected corner portion on an outer side of the module cover 160 where a corner of the top plate part 161 and a corner of the side plate part 162 are connected with each other are utilized as a stopper mechanism which restricts a moving range of the movable module 1 to the front side in the Z-axis direction. In this embodiment, a stopper piece 267 (impact absorption material) made of resin or hard rubber is adhesively fixed to the recessed corner portion of the fixed cover 260. A face of the stopper piece 267 which faces the projected corner portion of the module cover 160 through a gap space "GZ12" is formed in a circular arc face 267s with the swing support point (pivot part structuring support mechanism 400) of the movable module 1 as a center. The circular arc face 267s is to be abutted with the projected corner portion of the module cover 160 and functions as a stopper. Therefore, even when the movable module 1 is inclined, the moving range of the movable module 1 to the front side in the Z-axis direction can be restricted accurately.

Third Another Embodiment of Stopper Mechanism

Figure 17:
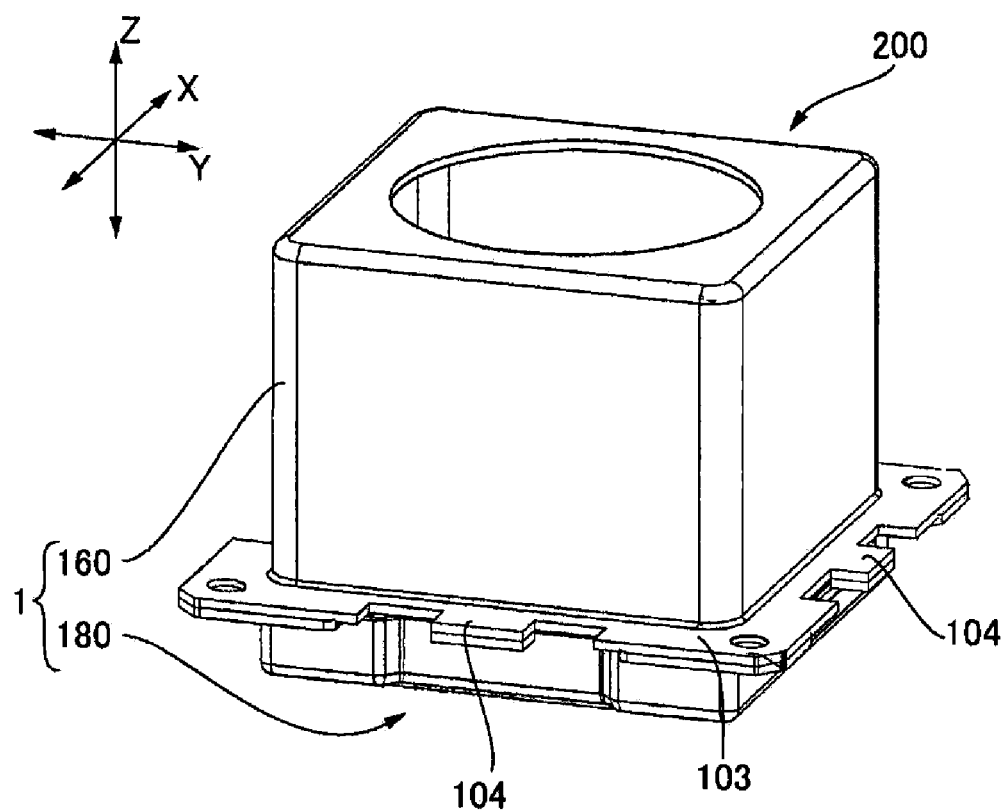
FIG. 17 is an explanatory view showing a third another embodiment of a stopper mechanism in an optical unit with shake correcting function in accordance with at least an embodiment of the present invention.

FIG. 17 is an explanatory view showing a third another embodiment of a stopper mechanism of the optical unit 200 with shake correcting function to which at least an embodiment of the present invention is applied. FIG. 17 is a perspective view showing the module cover 160 and the sensor cover 180.

As shown in FIG. 17, in the optical unit 200 with shake correcting function 200 in this embodiment, a portion corresponding to a side part of the movable module 1 is provided with a protruded part 104 which is protruded in a direction intersecting the Z-axis direction (in this embodiment, a direction perpendicular to the Z-axis direction). Therefore, when abutting portions interposing the protruded part 104 from both sides in the Z-axis direction are formed in the fixed body 210, a stopper mechanism is structured which restricts a moving range of the movable module 1 in both directions in the Z-axis direction. According to this structure, the protruded part 104 is located on the swing center line of the movable module 1 in the X-axis direction and the Y-axis direction when viewed in the Z-axis direction and thus, even when the movable module 1 is swung, displacement in the Z-axis direction is small. Therefore, the moving range in the Z-axis direction of the movable module 1 is restricted accurately.

Fourth Another Embodiment of Stopper Mechanism

Figure 18:
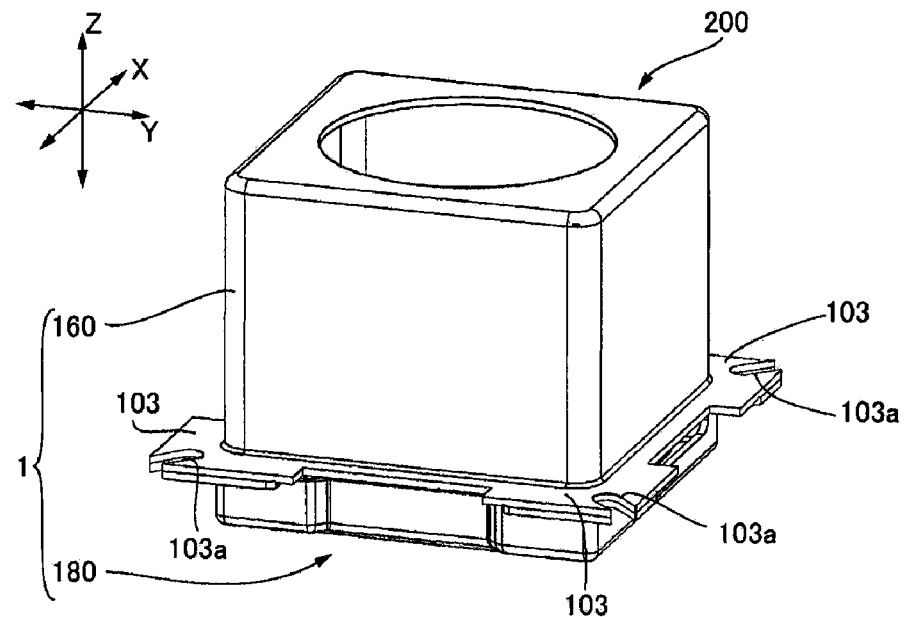
FIG. 18 is an explanatory view showing a fourth another embodiment of a stopper mechanism in an optical unit with shake correcting function in accordance with at least an embodiment of the present invention.

FIG. 18 is an explanatory view showing a fourth another embodiment of a stopper mechanism of the optical unit 200 with shake correcting function to which at least an embodiment of the present invention is applied. FIG. 18 is a perspective view showing the module cover 160 and the sensor cover 180.

As shown in FIG. 18, in the optical unit 200 with shake correcting function 200 in this embodiment, a slit-like cut-out part 103*a* is formed in the protruded part 103 which is protruded from the corner part of the movable module 1. Therefore, when a projection which is located within the cut-out part 103*a* is formed in the fixed body 210, a stopper mechanism is structured which restricts a moving range around the Z-axis of the movable module 1.

Fifth Another Embodiment of Stopper Mechanism

Figure 19:
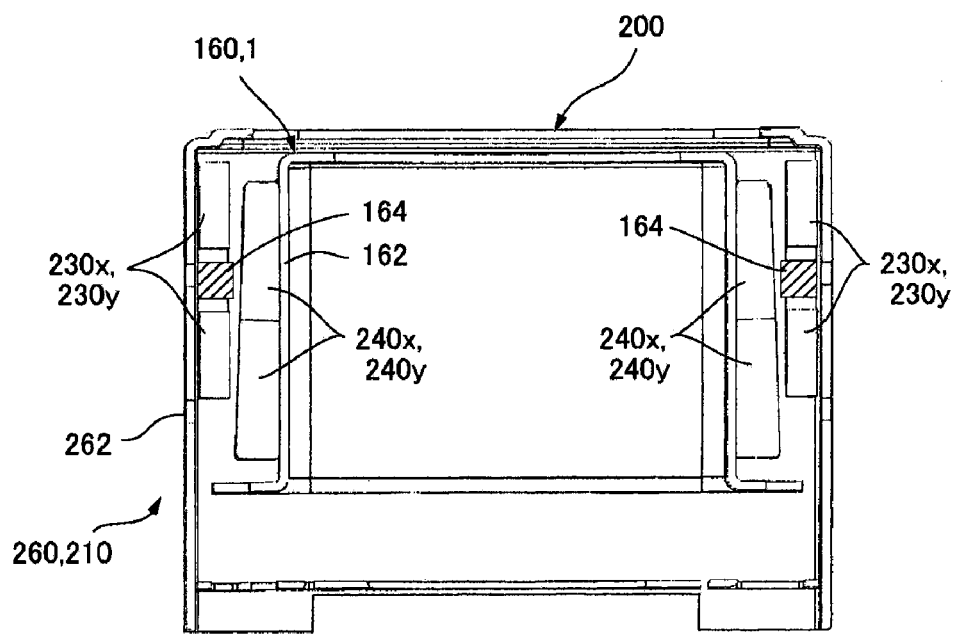
FIG. 19 is an explanatory view showing a fifth another embodiment of a stopper mechanism in an optical unit with shake correcting function in accordance with at least an embodiment of the present invention.

FIG. 19 is an explanatory view showing a fifth embodiment of a stopper mechanism of the optical unit 200 with shake correcting function to which at least an embodiment of the present invention is applied. FIG. 19 is a cross-sectional view showing a part of the optical unit 200 with shake correcting function.

As shown in FIG. 19, in the optical unit 200 with shake correcting function in this embodiment, protruded parts 164 are formed on inner sides of the shake correction coils 230*x* and 230*y* structured of an air-core coil which are fixed to an inner face of the side plate part 262 of the fixed cover 220 so as to protrude to inner sides with respect to the shake correction coils 230*x* and 230*y*. Therefore, the protruded parts 164 and the shake correction magnets 240*x* and 240*y* structure a stopper mechanism which restricts moving ranges of the movable module 1 in both directions in the X-axis direction, both directions in the Y-axis direction, both directions around the X-axis and both directions around the Y-axis. According to this structure, abutting of the shake correction coils 230*x* and 230*y* with the shake correction magnets 240*x* and 240*y* are surely prevented and thus disconnection of the shake correction coils 230*x* and 230*y* and the like can be prevented surely. The protruded part 164 is, for example, structured by means of that impact absorption material such as a resin piece or a hard rubber piece is stuck and fixed on an inner face of the side plate part 262 of the fixed cover 220. In accordance with an embodiment, the protruded parts 164 and the shake correction magnets 240*x* and 240*y* may be utilized for restricting a part of the moving ranges of the movable module 1 in both directions in the X-axis direction, both directions in the Y-axis direction, both directions around the X-axis and both directions around the Y-axis.

Mounting Structure on Optical Device

Figure 20:
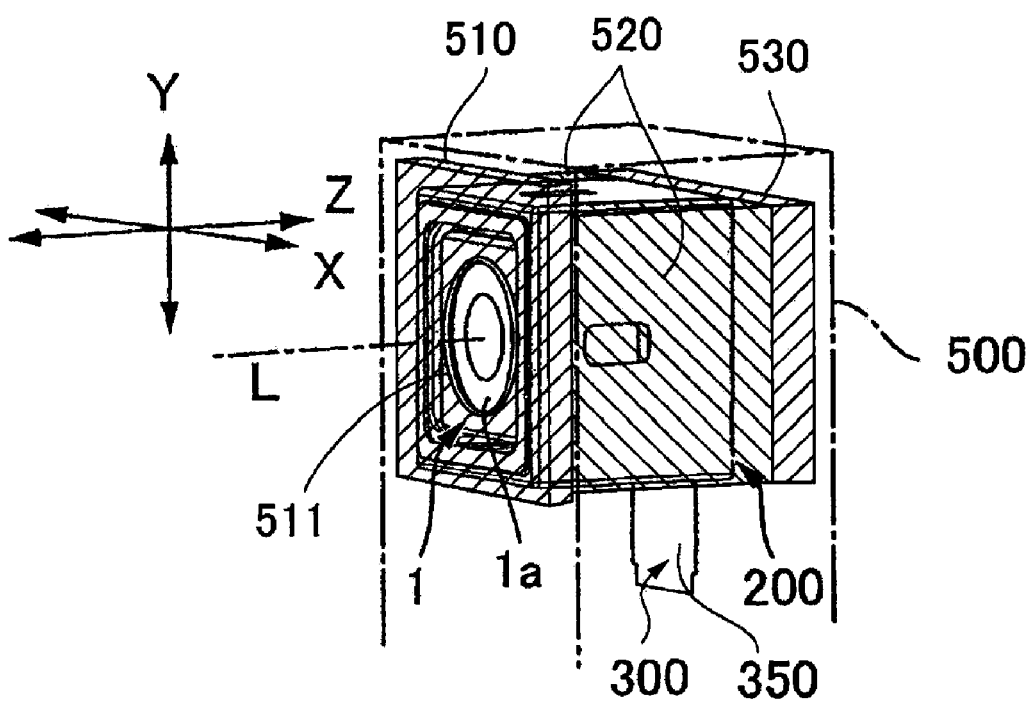
FIG. 20 is an explanatory view showing an optical device on which an optical unit with shake correcting function is mounted in accordance with at least an embodiment of the present invention.

FIG. 20 is an explanatory view showing an optical device 500 on which the optical unit 200 with shake correcting function is mounted to which at least an embodiment of the present invention is applied.

As shown in FIG. 20, in order to mount the optical unit 200 with shake correcting function in this embodiment on an optical device 500, it is preferable that the optical unit 200 with shake correcting function is mounted on an optical device main body through impact absorption materials 510, 520 and 530. In this embodiment, the impact absorption material 520 is disposed on side faces in the X-axis direction of the optical unit 200 with shake correcting function, the impact absorption material 530 is disposed on the rear side in the Z-axis direction of the optical unit 200 with shake correcting function, and the impact absorption material 510 is disposed on the front side in the Z-axis direction of the optical unit 200 with shake correcting function.

In this embodiment, the impact absorption material 510 is formed with an opening part 511 so that light from an object to be photographed is incident to the optical unit 200 with shake correcting function. Further, the impact absorption material 510 has a size so as to cover the entire front end face of the optical unit 200 with shake correcting function.

In accordance with an embodiment, a part of the impact absorption material 510 may be inserted into an inner side from the opening part 261*a* of the fixed cover 260 which is used in the optical unit 200 with shake correcting function and the inserted portion is utilized as a stopper for the movable module 1. On the other hand, a projection may be formed on the movable module 1 so as to be capable of protruding to an outer side from the opening part 261*a* of the fixed cover 260 and a stopper mechanism may be structured by the projection and the impact absorption material 510. In addition, it may be structured that the top plate part 261 is not formed in the fixed cover 260, and the impact absorption material 510 and the movable module 1 are faced each other in the Z-axis direction, and the impact absorption material 510 is utilized as a stopper for the movable module 1.

Other Embodiments (Structure of Shake Correction Magnetic Drive Mechanism)

In the embodiment described above, both of the first magnetic drive mechanism 250*x* for shake correction and the second magnetic drive mechanism 250*y* for shake correction are provided for the movable module 1 as the magnetic drive mechanism for shake correction. However, at least an embodiment of the present invention may be applied to a case that only one of the first magnetic drive mechanism 250*x* for shake correction and the second magnetic drive mechanism 250*y* for shake correction is provided in order to correct only a shake in a direction where a shake easily occurs when a user uses the optical unit 200. In other words, only one of the first magnetic drive mechanism 250*x* for shake correction and the second magnetic drive mechanism 250*y* for shake correction may be provided in a pair on both sides interposing the support protruded part 227. In this case, the extending direction of the flexible circuit board 300 may be set in only the Y-axis direction.

In the embodiment described above, in each of the first magnetic drive mechanism 250*x* for shake correction and the second magnetic drive mechanism 250*y* for shake correction, the magnet (shake correction magnets 240*x* and 240*y*) is held on the movable module 1 which is the movable body, and the coil (shake correction coils 230*x* and 230*y*) is held by the fixed body 210. However, it may be structured that the shake correction coil is held by the movable module 1 which is the movable body and the shake correction magnet is held by the fixed body 210.

(Structure of Urging Member)

In the embodiment described above, the spring member 280 is used as the urging member which is provided with a plurality of arm parts 287 that are linearly extended in the same circumferential direction. However, when a plurality of arm parts 287 are extended in the same circumferential direction, the arm parts 287 may be extended in a curved manner.

In the embodiment described above, only the spring member 280 is used as the urging member for urging the movable module 1 toward the base 220. However, a magnetic spring which urges the movable module 1 toward the base 220 by magnetic operation and a mechanical spring member which mechanically urges the movable module 1 toward the base 220 may be used as the urging member. Further, as the magnetic spring, a structure is adopted that a magnetic body is disposed on the rear side of the shake correction magnets 240x and 240y in the fixed body 210. According to this structure, a state where the movable module 1 is supported by the support mechanism 400 is surely maintained. Further, it may be structured that the movable module 1 is urged toward the base 220 only by the magnetic spring and the spring member 280 is set in a non-deformed state in which the spring member 280 does not generate an urging force during a neutral period when the magnetic drive mechanism for shake correction is not operated. In this case, when the movable module 1 is swung, the spring member 280 is deformed to generate an urging force. In other words, the spring member 280 keeps a flat shape during a period when the movable module 1 is not swung. Therefore, a portion having linearity between a force applied to the spring member 280 and a deformed amount of the spring member 280 is utilized effectively and thus the movable module 1 is appropriately swung and the shake correction can be performed surely.

In at least an embodiment of the present invention, it is preferable that vibration absorption material such as gel material or elastic sheet is fitted to the connected portions of the arm parts 283 with the fixed side connecting parts 281, the connected portions of the arm parts 283 with the movable module side connecting parts 282, or to the entire arm parts 283 in the spring member 280. In a case that this measure is performed, when the movable module 1 is swung, vibration of the arm parts 283 can be rapidly stopped and thus vibration of the movable module 1 can be also rapidly stopped.

(Structure of Swing Support Point)

In the embodiment described above, the small protruded part 227a is formed at the tip end of the support protruded part 227 but the entire support protruded part 227 may be formed in a hemispherical shape. Further, in the embodiment described above, the support protruded part 227 is formed in the base 220 and the recessed part 187 is formed in the sensor cover 180. However, a support protruded part is formed in the sensor cover 180 and a recessed part for receiving the support protruded part may be formed in the base 220.

(Structure of Support Mechanism)

In order to support the movable module 1 to be capable of being swung with an opposite side to an object to be photographed side as its swinging center, a plurality of wire suspensions which are extended toward the object to be photographed side from the opposite side to the object to be photographed side is used as a swing support part instead of the pivot part and the movable module 1 may be supported by a plurality of the wire suspensions.

In a case of this structure, even when a pivot part and the like for determining a swing center of the movable module 1 is not provided, the movable module 1 can be supported to be capable of swinging.

In addition, instead of using the pivot part, one or plural pieces of flat spring-shaped spring member 280 shown in FIG. 6 may be used to support the movable module 1 to be capable of swinging. Also in a case of the structure, similarly to the case in which suspension wires are used, even when a pivot part and the like for determining a swing center of the movable module 1 is not provided, the movable module 1 can be supported to be capable of swinging. In order to adopt the structure, when the movable module 1 is supported by one piece of flat spring-shaped spring member 280, the movable module 1 is swung with a portion connected with the spring member 280 as a center. For example, when the spring member 280 is connected with an end part in the optical axis direction of the movable module 1, the movable module 1 is swung with the end part as a center. Further, when the spring member 280 is connected with an intermediate portion in the optical axis direction of the movable module 1, the movable module 1 is swung with the intermediate portion as a center. On the other hand, when two pieces of flat spring-shaped spring member 280 are connected with two positions of the movable module 1 which are separated from each other in the optical axis direction, the movable module 1 is swung with a position between the portions where two pieces of spring members 280 are connected as a center.

(Other Structures)

In the embodiment described above, at least an embodiment of the present invention is applied to the optical unit 200 with shake correcting function which utilizes the lens drive module la whose lens drive coils 30s and 30t are formed in a rectangular tube shape and whose lens drive magnets 17 are formed in a flat plate shape. However, at least an embodiment of the present invention may be applied to an optical unit with shake correcting function which utilizes a movable module that is structured so that the lens drive coils 30s and 30t are formed in a cylindrical tube shape, the case 18 is formed in a rectangular tube shape, and the lens drive magnets 17 are disposed at corner portions of the case 18.

In the embodiment described above, at least an embodiment of the present invention is applied to the optical unit 200 with shake correcting function which is used in a cell phone with a camera. However, at least an embodiment of the present invention may be applied to the optical unit 200 with shake correcting function which is used in a thin digital camera or the like. Further, in the embodiment described above, the movable module 1 includes, in addition to the lens 121 and the imaging element 15, the lens drive mechanism 5 for magnetically driving the movable body 3 including the lens 121 in the optical axis "L" direction which is supported on the support body 2. However, at least an embodiment of the present invention may be applied to a fixed focus type optical unit with shake correcting function in which the lens drive mechanism 5 is not mounted on the movable module 1.

In addition, other than a cell phone, a digital camera or the like, the optical unit 200 with shake correcting function to which at least an embodiment of the present invention is applied may be fixed and mounted in an apparatus such as a refrigerator where vibration is occurred in a certain interval so as to be capable of being remote controlled. According to this structure, a service can be provided where information in the inside of the refrigerator is obtained at a visit place, for example, at the time of shopping. According to this service, since the camera system is provided with an attitude stabilizing device, a stable image can be transmitted even when vibration may occur in the refrigerator. Further, this device may be fixed to a device such as a bag, a satchel or a cap for a child and a student which is carried at a time of commuting or attending school. In this case, conditions of surroundings are photographed at a constant interval and, when the image is transferred to a predetermined server, the parent or the like watches the image at a remote place to secure security of the child. In this application, without being conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 200 with shake correcting function to which at least an embodiment of the present invention is applied is mounted at a position which is capable of photographing toward a front side in a car, it can be used as a drive recorder. Further, it may be structured that the optical unit 200 with shake correcting function to which at least an embodiment of the present invention is applied is mounted at a position which is capable of photographing toward a front side in a car and a peripheral image is photographed automatically at a constant interval, which is automatically transferred to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of this application, when a power supply is turned on, a command signal is outputted to the control section 800 and the shake control is started on the basis of the command signal.

Further, the optical unit 200 with shake correcting function in accordance with at least an embodiment of the present invention may be applied to shake correction of an optical device from which a light beam is emitted such as a laser beam pointer, a portable or on-vehicle projection display device and direct viewing type display device. Further, in observation with high magnification such as an astronomical telescope system or a binocular system, the optical unit 200 with shake correcting function may be used to observe without using an auxiliary locking device such as three-legged supports. Further, as an auxiliary instrument for a physically handicapped person who has trouble with hand such as continuous shaking, life support operation can be enabled by setting a writing implement or a spoon in the movable part. In addition, when at least an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with shake correcting function comprising:
   a movable module on which an optical element is mounted;
   a fixed body which supports the movable module;
   a shake detection sensor which detects a shake of the movable module;
   a shake correction magnetic drive mechanism which swings the movable module on the fixed body on a basis of a detection result of the shake detection sensor to correct the shake of the movable module; and
   a spring member which is connected with the fixed body and the movable module;
   a swing support point which is structured between the fixed body and the movable module;
   wherein the spring member urges the movable module toward the swing support point, and a portion of the fixed body which structures the swing support point is provided with a spring part that enables the swing support point to displace in an optical axis direction;
   wherein when three directions perpendicular to each other in the fixed body are set to be an X-axis, a Y-axis and a Z-axis, and a direction along an optical axis is set to be the Z-axis, a stopper mechanism is structured between the movable module and the fixed body, and the stopper mechanism restricts moving ranges of the movable module due to the shake in both directions in an X-axis direction, both directions in a Y-axis direction, both directions in a Z-axis direction, both directions around the X-axis, both directions around the Y-axis and both directions around the Z-axis.

2. An optical unit with shake correcting function comprising:
   a movable module on which an optical element is mounted;
   a fixed body which supports the movable module;
   a shake detection sensor which detects a shake of the movable module;
   a shake correction magnetic drive mechanism which swings the movable module on the fixed body on a basis of a detection result of the shake detection sensor to correct the shake of the movable module;
   a spring member which is connected with the fixed body and the movable module; and
   a swing support point which is structured between the fixed body and the movable module;
   wherein the spring member urges the movable module toward the swing support point and a portion of the fixed body which structures the swing support point is provided with a spring part that enables the swing support point to displace in an optical axis direction.

3. The optical unit with shake correcting function according to claim 2, wherein the spring part is a flat spring part which is structured so that the fixed body is worked.

4. The optical unit with shake correcting function according to claim 3, wherein a rear side of the swing support point and a portion of the fixed body where the flat spring part is formed is dented to a front side.

5. The optical unit with shake correcting function according to claim 2, wherein
   when three directions perpendicular to each other in the fixed body are set to be an X-axis, a Y-axis and a Z-axis, and a direction along an optical axis is set to be the Z-axis,
   a stopper mechanism is structured between the movable module and the fixed body, and the stopper mechanism restricts moving ranges of the movable module in both directions in an X-axis direction, both directions in a Y-axis direction, both directions in a Z-axis direction, both directions around the X-axis, both directions around the Y-axis and both directions around the Z-axis.

6. The optical unit with shake correcting function according to claim 5, wherein
the swing support point part is a pivot part which is provided with a support protruded part, which is protruded in the Z-axis direction from one of the fixed body and the movable module, and a supporting recessed part which is formed on the other of the fixed body and the movable module and into which the support protruded part is fitted, and
in the stopper mechanism, the moving range of the movable module in the both directions in the X-axis direction and the moving range of the both directions in the Y-axis direction are restricted between an outer peripheral side face of the support protruded part and an inner peripheral side face of the supporting recessed part.

7. The optical unit with shake correcting function according to claim 1, wherein
the movable module is provided with a protruded part which is protruded in a direction intersecting the Z-axis direction,
the fixed body is provided with a portion which faces the protruded part through a slight gap space and which is capable of abutting with the protruded part, and
in the stopper mechanism, at least one of the moving ranges of the movable module in the both directions in the X-axis direction, the both directions in the Y-axis direction, the both directions in the Z-axis direction, the both directions around the X-axis, the both directions around the Y-axis and the both directions around the Z-axis is restricted by the protruded part of the movable module and the portion which is capable of abutting with the protruded part provided in the fixed body.

8. The optical unit with shake correcting function according to claim 7, wherein
a shape of the movable module when viewed in the Z-axis direction is rectangular, and
in the stopper mechanism, at least one of the moving ranges of the movable module in the both directions around the X-axis, the both directions around the Y-axis and the both directions around the Z-axis is restricted between the protruded part and the portion of the fixed body which is capable of abutting with the protruded part at a corner portion when the movable module is viewed in the Z-axis direction.

9. The optical unit with shake correcting function according to claim 7, wherein, in the stopper mechanism, the moving range of the movable module in the both directions in the Z-axis direction is restricted between the protruded part and the fixed body on a swing center line of the movable module when viewed in the Z-axis direction.

10. The optical unit with shake correcting function according to claim 8, wherein, in the stopper mechanism, the moving ranges of the movable module in the both directions in the X-axis direction and the both directions in the Y-axis direction are restricted between the protruded part and the portion of the fixed body which is capable of abutting with the protruded part.

11. The optical unit with shake correcting function according to claim 10, wherein the protruded part is disposed in the Z-axis direction between a position in the Z-axis direction of a magnet and a coil which structure the shake correction magnetic drive mechanism and a position in the Z-axis direction of the swing support point.

12. The optical unit with shake correcting function according to claim 1, wherein, in the stopper mechanism, a portion of at least one of the movable module and the fixed body which restricts the moving range in one of the both directions in the Z-axis direction is formed in a circular arc face with a swing center of the movable module as a center.

13. The optical unit with shake correcting function according to claim 12, wherein
in the stopper mechanism, the moving range to a front side in the Z-axis direction of the movable module is restricted between a front end part of the movable module and a front end part of the fixed body, and
at least one of the front end part of the movable module and the front end part of the fixed body is formed in the circular arc face with the swing center of the movable module as the center.

14. The optical unit with shake correcting function according to claim 1, wherein, in the stopper mechanism, at least one of the moving ranges of the movable module in the both directions in the X-axis direction, the both directions in the Y-axis direction, the both directions around the X-axis, and the both directions around the Y-axis is restricted between a protruded part which is disposed on an inner side of an air-core coil and a magnet that are used in the shake correction magnetic drive mechanism.

15. The optical unit with shake correcting function according to claim 7, wherein at least one of portions of the movable module and the fixed body structuring the stopper mechanism is formed of resin or rubber.

16. The optical unit with shake correcting function according to claim 7, wherein at least one of portions of the movable module and the fixed body structuring the stopper mechanism is formed of impact absorption material which is stuck on the movable module or the fixed body.

17. The optical unit with shake correcting function according to claim 7, wherein the optical element is a lens,
the movable module is mounted with an imaging element on a rear side with respect to the lens, and
the shake detection sensor is mounted on the movable module to detect a shake at a time of photographing.

18. An optical device comprising:
the optical unit with shake correcting function which is described in claim 1; and
impact absorption material through which the optical unit with shake correcting function is mounted on an optical device main body.

19. The optical unit with shake correcting function according to claim 17, wherein
the movable module is provided with a lens drive module which includes a focus mechanism for the lens in an inside of the lens drive module, and
the lens drive module is provided with a movable body which holds the lens in an inside of the movable body, a lens drive mechanism for moving the movable body along an optical axis direction of the lens, and a support body on which the lens drive mechanism and the movable body are mounted.

20. The optical unit with shake correcting function according to claim 5, wherein
the movable module is provided with a protruded part which is protruded in a direction intersecting the Z-axis direction, and
in the stopper mechanism, at least one of the moving ranges of the movable module in the both directions in the X-axis direction, the both directions in the Y-axis direction, the both directions in the Z-axis direction, the both directions around the X-axis, the both directions around the Y-axis and the both directions around the Z-axis is restricted.

21. The optical unit with shake correcting function according to claim 20, wherein
a shape of the movable module when viewed in the Z-axis direction is rectangular, and
in the stopper mechanism, at least one of the moving ranges of the movable module in the both directions around the X-axis, the both directions around the Y-axis and the both directions around the Z-axis is restricted between the protruded part and the fixed body at a corner portion when the movable module is viewed in the Z-axis direction.

22. The optical unit with shake correcting function according to claim 20, wherein, in the stopper mechanism, the moving range of the movable module in the both directions in the Z-axis direction is restricted between the protruded part and the fixed body on a swing center line of the movable module when viewed in the Z-axis direction.

23. The optical unit with shake correcting function according to claim 20, wherein, in the stopper mechanism, the moving ranges of the movable module in the both directions in the X-axis direction and the both directions in the Y-axis direction are restricted between the protruded part and the fixed body.

24. The optical unit with shake correcting function according to claim 20, wherein the protruded part is disposed in the Z-axis direction between a position in the Z-axis direction of a magnet and a coil which structure the shake correction magnetic drive mechanism and a position in the Z-axis direction of the swing support point.

25. The optical unit with shake correcting function according to claim 5, wherein, in the stopper mechanism, a portion of at least one of the movable module and the fixed body which restricts the moving range in one of the both directions in the Z-axis direction is formed in a circular arc face with a swing center of the movable module as a center.

26. The optical unit with shake correcting function according to claim 25, wherein
in the stopper mechanism, the moving range to a front side in the Z-axis direction of the movable module is restricted between a front end part of the movable module and a front end part of the fixed body, and
at least one of the front end part of the movable module and the front end part of the fixed body is formed in the circular arc face with the swing center of the movable module as the center.

27. The optical unit with shake correcting function according to claim 5, wherein, in the stopper mechanism, at least one of the moving ranges of the movable module in the both directions in the X-axis direction, the both directions in the Y-axis direction, the both directions around the X-axis, and the both directions around the Y-axis is restricted between a protruded part which is disposed on an inner side of an air-core coil and a magnet that are used in the shake correction magnetic drive mechanism.

28. The optical unit with shake correcting function according to claim 5, wherein at least one of portions of the movable module and the fixed body structuring the stopper mechanism is formed of resin or rubber.

29. The optical unit with shake correcting function according to claim 5, wherein at least one of portions of the movable module and the fixed body structuring the stopper mechanism is formed of impact absorption material which is stuck on the movable module or the fixed body.

30. The optical unit with shake correcting function according to claim 2, wherein
the optical element is a lens,
the movable module is mounted with an imaging element on a rear side with respect to the lens, and
the shake detection sensor is mounted on the movable module to detect a shake at a time of photographing.

31. An optical device comprising:
the optical unit with shake correcting function which is described in claim 2; and impact absorption material through which the optical unit with shake correcting function is mounted on an optical device main body.

* * * * *